US006931138B2

(12) United States Patent
Kawamura et al.

(10) Patent No.: US 6,931,138 B2
(45) Date of Patent: Aug. 16, 2005

(54) ZOOM MICROPHONE DEVICE

(75) Inventors: Takashi Kawamura, Osaka (JP); Takeo Kanamori, Hirakata (JP); Toshihide Ishimoto, Izumi (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 645 days.

(21) Appl. No.: 09/983,284

(22) Filed: Oct. 23, 2001

(65) Prior Publication Data

US 2002/0064287 A1 May 30, 2002

(30) Foreign Application Priority Data

Oct. 25, 2000 (JP) ....................................... 2000-325285

(51) Int. Cl.[7] ............................. H04R 3/00; H04N 5/76

(52) U.S. Cl. ...................... 381/92; 381/94.1; 348/231.4

(58) Field of Search ........................ 381/92, 94.7, 94.1, 381/26, 94.2, 94.3; 348/14.1, 222.1, 231.4; 358/906

(56) References Cited

U.S. PATENT DOCUMENTS 4,862,278 A 8/1989 Dann et al.
4,984,087 A 1/1991 Fujimura et al.
5,477,270 A * 12/1995 Park ............................ 381/92
6,445,801 B1 * 9/2002 Pastor et al. ............... 381/94.2

FOREIGN PATENT DOCUMENTS

JP 06-090493 3/1994
JP 06178383 A * 6/1994 ........... H04R/3/00
JP 10-032804 2/1998

* cited by examiner

*Primary Examiner*—Brian T. Pendleton
(74) *Attorney, Agent, or Firm*—Wenderoth, Lind & Ponack, L.L.P.

(57) ABSTRACT

A pickup section transduces sounds to audio signals. A zoom control section outputs a zoom position signal corresponding to a zoom position. A directivity control section alters the directivity characteristics under a telescopic operation so as to mainly pick up sounds coming from a frontal direction with an enhancement which is in accordance with the zoom position signal, thereby outputting an R channel audio signal and an L channel audio signal. In accordance with the zoom position signal, a noise suppression section applies a greater degree of suppression to the background noise contained in the respective channel audio signals under the telescopic operation than under a wide-angle operation. As a result, a target sound from a remote location can be picked up with a sufficient enhancement in accordance with the zoom position under the telescopic operation.

3 Claims, 19 Drawing Sheets

| | | | |
|---|---|---|---|
| ZOOM POSITION | WIDE-ANGLE | ↔ | TELESCOPIC |
| DEGREE OF NOISE SUPPRESSION | SMALL | ↔ | GREAT |

×: FILTERING COEFFICIENT AS CALCULATED AT EACH POINT IN TIME

ZOOM MICROPHONE DEVICE

BACKGROUND OF THE INVENTION

1. Field of the Invention

The present invention relates to a zoom microphone device, and more particularly, to a zoom microphone device having an audio zooming function which allows a target sound to be picked up with an effective enhancement in accordance with a zoom position.

2. Description of the Background Art

In the field of video cameras and digital cameras having the ability of imaging moving pictures, etc., zoom microphone devices are conventionally available which are capable of zooming in on a target sound in synchronization with a zooming motion of a lens so as to pick up the target sound with a high SNR (signal-to-noise ratio). Examples of methods for realizing such a zoomed picking-up of sounds include methods which involve simple frequency compensation, and methods which involve altering the directivity characteristics of a microphone through digital signal processing. Hereinafter, conventional zoom microphone devices utilizing these methods will be briefly described with reference to the accompanying drawings.

As a first conventional example, FIG. 21 illustrates a zoom microphone device structure which realizes zoomed picking-up of sounds with a simple frequency compensation technique. The zoom microphone device of the first conventional example includes a pickup section 900, a zoom control section 901, and a high-pass filter 902. The pickup section 900 transduces sounds to an audio signal. The zoom control section 901 outputs a zoom position signal which determines a zoom position. The high-pass filter 902 enhances a high-frequency range of the audio signal that is outputted from the pickup section 900, the frequency characteristics thereof being adjusted in accordance with the zoom position signal which is outputted from the zoom control section 901. This adjustment occurs in such a manner that the high-frequency range of an input audio signal is more enhanced as the zoom position is moved closer to the telescopic end from a wide-angle end.

Sounds which are input to the pickup section 900 usually include target sounds as well as some background noise. Under a telescopic operation, target sounds are typically generated at a relatively remote location from the zoom microphone device. The ambient noise generally has a spectrum which is relatively concentrated in the low-frequency ranges. Therefore, under the telescopic operation, the low-frequency ranges of the audio signal which is output from the pickup section 900 may be cut off by means of the high-pass filter 902 so as to relatively reduce the proportion of the background noise in the audio signal. Thus, an improved SNR can be provided under the telescopic operation which enables zooming effects.

As a second conventional example, FIG. 22 illustrates a zoom microphone device structure which realizes zoomed picking-up of sounds by altering the directivity characteristics of a microphone through digital signal processing. The zoom microphone device of the second conventional example includes a pickup section 903, a zoom control section 904, a directivity control section 905, and a volume control section 906. The pickup section 903 includes microphone units 907*a* and 907*b*. The directivity control section 905 includes: an adder 908; amplifiers 909, 910*a*, 910*b* and 910*c*; and adders 911*a* and 911*b*.

The microphone units 907*a* and 907*b* are oriented at certain angles with respect to a frontal direction of the zoom microphone device. The adder 908 adds the respective audio signals that are outputted from the microphone units 907*a* and 907*b*. The amplifier 909 multiplies the amplitude of the resultant added audio signal by 0.5. The amplifiers 910*a*, 910*b*, and 910*c* adjust the amplitude levels of the audio signals that are outputted from the microphone units 907*a* and 907*b* and the amplifier 909, respectively, in accordance with a zoom position signal which is output from the zoom control section 904. Specifically, under a wide-angle operation, the gain of each of the amplifiers 910*a* and 910*b* is set to "1", and the gain of the amplifier 910*c* is set to "0". On the other hand, under the telescopic operation, the gain of each of the amplifiers 910*a* and 910*b* is set to "0", and the gain of the amplifier 910*c* is set to "1". The adder 911*a* adds the output from the amplifier 910*c* to the output from the amplifier 910*a*, thereby outputting an R channel audio signal. The adder 911*b* adds the output from the amplifier 910*c* to the output from the amplifier 910*b*, thereby outputting an L channel audio signal.

Sounds which are input to the pickup section 903 usually include target sounds as well as some background noise. Under the telescopic operation, target sounds are typically generated in the frontal direction of the zoom microphone device, while the background noise occurs in an omnidirectional manner. Therefore, under the telescopic operation, the directivity of the R channel and the L channel may be oriented toward the frontal direction so as to reduce the proportion of the background noise in the audio signals of the respective channels in a relative manner. Thus, an improved SNR can be provided under the telescopic operation which enables zooming effects.

The zoom microphone device of the second conventional example includes the volume control section 906 for the following reason. In general, the source of a target sound under the telescopic operation is located farther away from the source of a target sound under the wide-angle operation. Therefore, a target sound under the telescopic operation has a relatively low sound volume when picked up by the zoom microphone device. Accordingly, the volume control section 906 is used to increase the sound volume of the audio signals of the respective channels under the telescopic operation, whereby zooming effects can be obtained.

However, according to the first conventional example as illustrated in FIG. 21, not only the low-frequency range of the ambient noise but also the low-frequency range of the target sound is cut off by the high-pass filter 902 under telescopic operation. Therefore, the tone (i.e., frequency characteristics) of the target sound may vary as the zoom position is changed.

According to the second conventional example as illustrated in FIG. 22, there is a problem in that any sound (i.e., not only the target sound but also the constantly-standing background noise) that comes from the frontal direction of the zoom microphone device under telescopic operation will be picked up, and as a result, the SNR may not be sufficiently improved.

There is also a problem with the technique of increasing the sound volume level under the telescopic operation through volume control in that not only the target sound but also the background noise level is inevitably increased. Therefore, this does not improve the SNR so as to sufficiently enhance the target sound.

SUMMARY OF THE INVENTION

Therefore, an object of the present invention is to provide a zoom microphone device which is capable of picking up a target sound with a sufficient enhancement under the telescopic operation, while suppressing the background noise without affecting the tone of the target sound.

The present invention has the following features to attain the above-described object.

A first aspect of the present invention is directed to a zoom microphone device having an audio zooming function of effectively enhancing a target sound in accordance with a zoom position. The zoom microphone device of the first aspect comprises: a pickup section for transducing soundwaves to audio signals; a zoom control section for outputting a zoom position signal corresponding to the zoom position; a directivity control section for altering the directivity characteristics of the zoom microphone device based on the zoom position signal which is outputted from the zoom control section; and a noise suppression section for suppressing background noise that is contained in the audio signals which are outputted from the pickup section. The directivity control section alters the directivity characteristics so as to enhance the target sound under telescopic operation, and a greater degree of suppression to the background noise that is contained in the audio signals under the telescopic operation than under a wide-angle operation.

Thus, according to the first aspect, sounds generally coming (originating) from the direction of a target sound are picked up under the telescopic operation, with only small amounts of unwanted sounds, if any, being picked up along with the target sound. Furthermore, the background noise which originates in the same direction as the target sound that is contained in the sounds which are picked up under the telescopic operation are subjected to a greater degree of suppression under the telescopic operation than under the wide-angle operation. As a result, as the zoom position is moved from the wide-angle to telescopic operation, the target sound can be effectively picked up with more enhancement.

According to a second aspect of the present invention, the zoom microphone device of the first aspect further comprises a volume control section for increasing a power level of the audio signals so as to be greater under the telescopic operation than under the wide-angle operation.

Thus, according to the second aspect, the sound volume level of an audio signal which is picked up under the telescopic operation is increased above the sound level of an audio signal which is picked up under wide-angle operation. Accordingly, the target sound can be effectively picked up with an enhancement which makes the target sound sound as if being picked up near the source of the target sound. By applying a greater degree of noise suppression under the telescopic operation than under the wide-angle operation, any concomitant increase in the background noise level that is associated with the increased sound volume level under the telescopic operation can be prevented. As a result, it is possible to pick up the target sound with a more effective enhancement.

According to a third aspect of the present invention, the directivity control section generates a plurality of channel audio signals based on the audio signals which are outputted from the pickup section. Further, according to the third aspect, the noise suppression section comprises a plurality of noise suppression units, wherein, based on the zoom position signal which is outputted from the zoom control section, the plurality of noise suppression units respectively apply a greater degree of suppression to the background noise that is contained in the plurality of channel audio signals under the telescopic operation than under the wide-angle operation.

Thus, according to the third aspect, a degree of noise suppression which is in accordance with the zoom position is applied to each channel audio signal. Consequently, the background noise that is contained in the respective channel audio signals receives a greater degree of suppression under the telescopic operation than under the wide-angle operation.

According to a fourth aspect of the present invention in accordance with the first aspect, the directivity control section generates a plurality of channel audio signals based on the audio signals which are outputted from the pickup section. Further, according to the fourth aspect, the noise suppression section comprises: an estimation section for estimating the amount of background noise that is contained in the plurality of channel audio signals based on at least one of the plurality of channel audio signals; and a plurality of suppression sections for suppressing the background noise that is contained in the respective channel audio signals based on a result of the estimation by the estimation section.

Thus, according to the fourth aspect, the amount of background noise is estimated based on at least one audio signal, and the background noise that is contained in the respective channel audio signals is suppressed based on the result of this estimation. As a result, the device structure of the zoom microphone device can be simplified, and the processing load can be reduced as compared to the processing load which is required for individually deriving an amount of background noise for each channel audio signal and accordingly suppressing the background noise.

According to a fifth aspect of the present invention in accordance with the fourth aspect, the estimation section comprises an averaging section for generating an audio signal which represents an average of the plurality of channel audio signals. Further, according to the fifth aspect, the estimation section estimates the amount of the background noise that is contained in the plurality of channel audio signals based on the audio signal which is generated by the averaging section.

Thus, according to the fifth aspect, the amount of background noise for suppression can be appropriately determined. Even if there is a substantial difference between the amounts of background noise that are contained in the respective channel audio signals, it is possible to maintain an appropriate degree of background noise suppression for the respective channel audio signals based on a fairly reliable estimation amount which is obtained through averaging the plurality of channel audio signals.

According to a sixth aspect of the present invention in accordance with the first aspect, the directivity control section comprises a mixing section, wherein the mixing section receives a plurality of audio signals which are based on the audio signals which are outputted from the pickup section, one of the plurality of received audio signals is a target sound signal which mainly contains soundwaves originating in a direction of a target sound, and the mixing section mixes the target sound signal with the other audio signals at a ratio which is in accordance with the zoom position signal. Further, according to the sixth aspect, the noise suppression section applies a predetermined degree of suppression only to the background noise that is contained in the target sound signal.

Thus, according to the sixth aspect, by simply applying a predetermined degree of noise suppression to the target sound signal, it is possible to obtain a greater degree of suppression on the background noise that is contained in the audio signals under the telescopic operation than under the wide-angle operation. Since there is no need to control the degree of noise suppression in accordance with the zoom position signal for each audio signal, the device structure of the zoom microphone device can be simplified.

According to a seventh aspect of the present invention in accordance with the first aspect, the noise suppression section comprises a Wiener filter.

Thus, according to the seventh aspect, the noise suppression section can be implemented by using a commonly-used Wiener filter.

These and other objects, features, aspects and advantages of the present invention will become more apparent from the following detailed description of the present invention when taken in conjunction with the accompanying drawings.

DETAILED DESCRIPTION OF THE INVENTION

Hereinafter, various embodiments of the present invention will be described with reference to the drawings. In each of these embodiments, control of the directivity characteristics of the zoom microphone device and background noise suppression are performed in accordance with a zoom position. Specifically, under a telescopic operation, the directivity characteristics are altered so that virtually only the target sound will be picked up, and a greater degree of suppression is applied to the background noise under the telescopic operation than under a wide-angle operation.

First Embodiment

Figure 1:
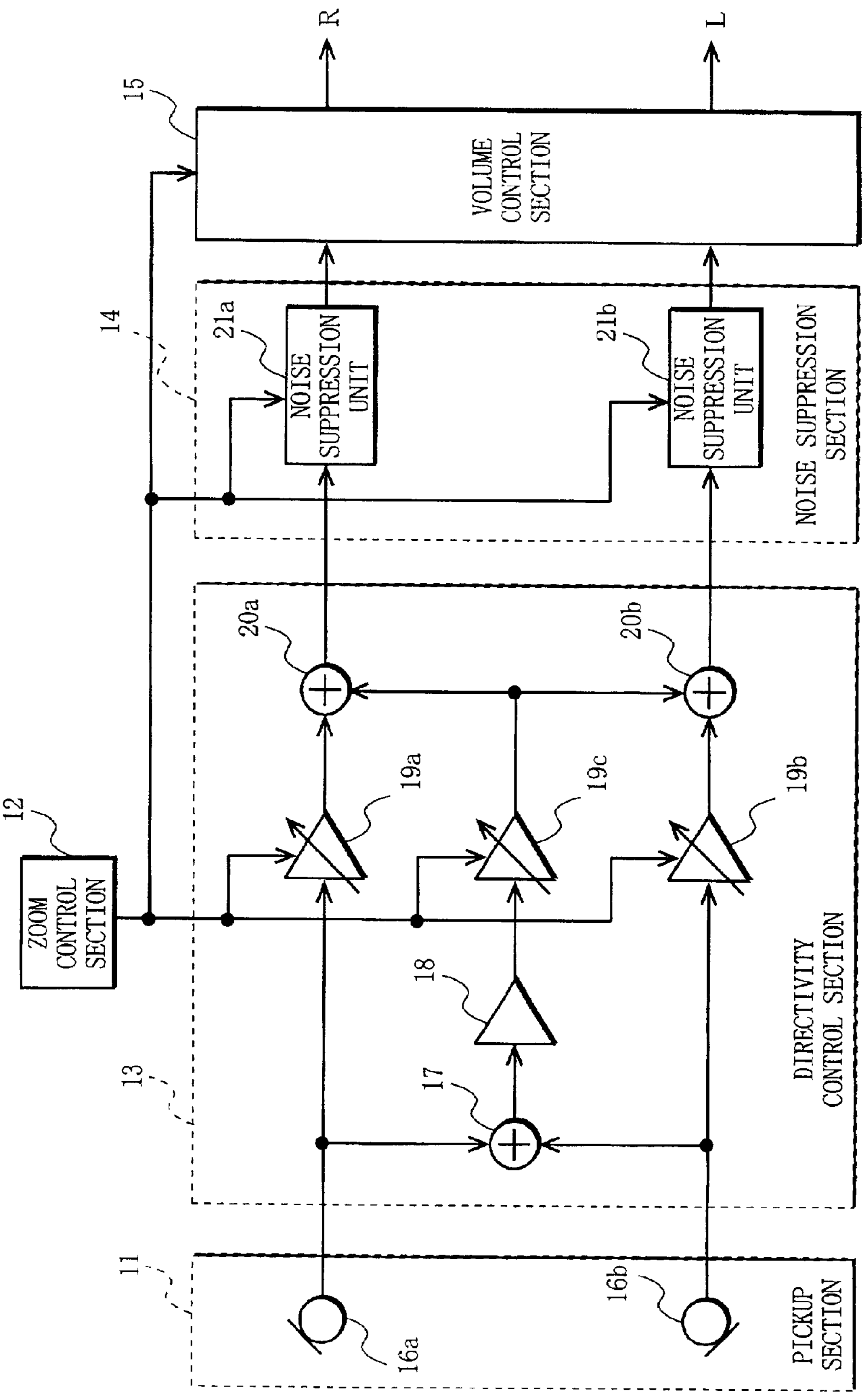
FIG. 1 is a block diagram illustrating the structure of a zoom microphone device according to a first embodiment of the present invention.

FIG. 1 illustrates the structure of a zoom microphone device according to a first embodiment of the present invention. As shown in FIG. 1, the zoom microphone device of the first embodiment includes a pickup section 11, a zoom control section 12, a directivity control section 13, a noise suppression section 14, and a volume control section 15. The pickup section 11 includes microphone units 16*a* and 16*b*. The directivity control section 13 includes: an adder 17; amplifiers 18, 19*a*, 19*b*, and 19*c*; and adders 20*a* and 20*b*. The noise suppression section 14 includes noise suppression units 21*a* and 21*b*. Hereinafter, the operation of the zoom microphone device according to the first embodiment will be described.

The microphone units 16*a* and 16*b* are unidirectional microphones for transducing sound waves to electric signals, which are outputted from the microphone units 16*a* and 16*b* as audio signals. The microphone units 16*a* and 16*b* are angled apart so as to be respectively oriented in the right or left direction and so that sounds can be picked up with increased presence. The audio signal that is outputted from the microphone unit 16*a* is supplied to the adder 17 and the amplifier 19*a*. The audio signal that is outputted from the microphone unit 16*b* is supplied to the adder 17 and the amplifier 19*b*. The adder 17 adds the respective audio signals that are outputted from the microphone units 16*a* and 16*b*. As a result of such an addition, an audio signal is generated in which the sound component which comes from the frontal direction of the zoom microphone device is mainly enhanced. The audio signal which has been generated by the adder 17 is supplied to the amplifier 18. The amplifier 18 multiplies the amplitude of the audio signal that is generated by the adder 17 by 0.5 so as to prevent the amplitude level of the audio signal that is generated by the adder 17 from becoming excessively large relative to the amplitude levels of the audio signals which are supplied to the amplifiers 19*a* and 19*b*. The audio signal which is outputted from the amplifier 18 is supplied to the amplifier 19*c*.

The zoom control section 12 outputs a zoom position signal which is in accordance with a zoom position. The amplifiers 19*a*, 19*b*, and 19*c* adjust the amplitude levels of the respective audio signals that are outputted from the microphone units 16*a* and 16*b* and the amplifier 18 in accordance with the zoom position signal which is outputted from the zoom control section 12. Specifically, under the wide-angle operation, the gain of both of the amplifiers 19*a* and 19*b* is set to "1", and the gain of the amplifier 19*c* is set to "0". Under the telescopic operation, the gain of both of the amplifiers 19*a* and 19*b* is set to "0", and the gain of the amplifier 19*c* is set to "1". In the intermediate regions between the wide-angle and telescopic operations, the gain of the amplifiers 19*a*, 19*b*, and 19*c* varies between "0" and "1" in corresponding manners in accordance with the zoom position.

The adder 20*a* adds the audio signals which are outputted from the amplifiers 19*a* and 19*c*, and outputs the resultant signal as an R channel audio signal. The adder 20*b* adds the audio signals which are outputted from the amplifiers 19*b* and 19*c*, and outputs the resultant signal as an L channel audio signal. Since the gains of the amplifiers 19*a*, 19*b*, and 19*c* are adjusted in accordance with the zoom position in the aforementioned manner, the R channel audio signal and the L channel audio signal are identical to the audio signals that are outputted from the microphone units 16*a* and 16*b* under the wide-angle operation, respectively, and each channel audio signal L and R is identical to the audio signal that is outputted from the amplifier 18 under the telescopic operation. In the intermediate regions between the wide-angle and telescopic operations, the audio signals are intermixed at a predetermined ratio which is in accordance with the zoom position. Accordingly, the R-channel and L-channel directivity characteristics, which are respectively identical to the directivity characteristics of the microphone units 16*a* and 16*b* under the wide-angle operation, gradually shift toward the frontal direction as the zoom position is moved to the telescopic end until the directivity of both channels R and L are aligned with the frontal direction under the telescopic operation.

Figures 2, 6:
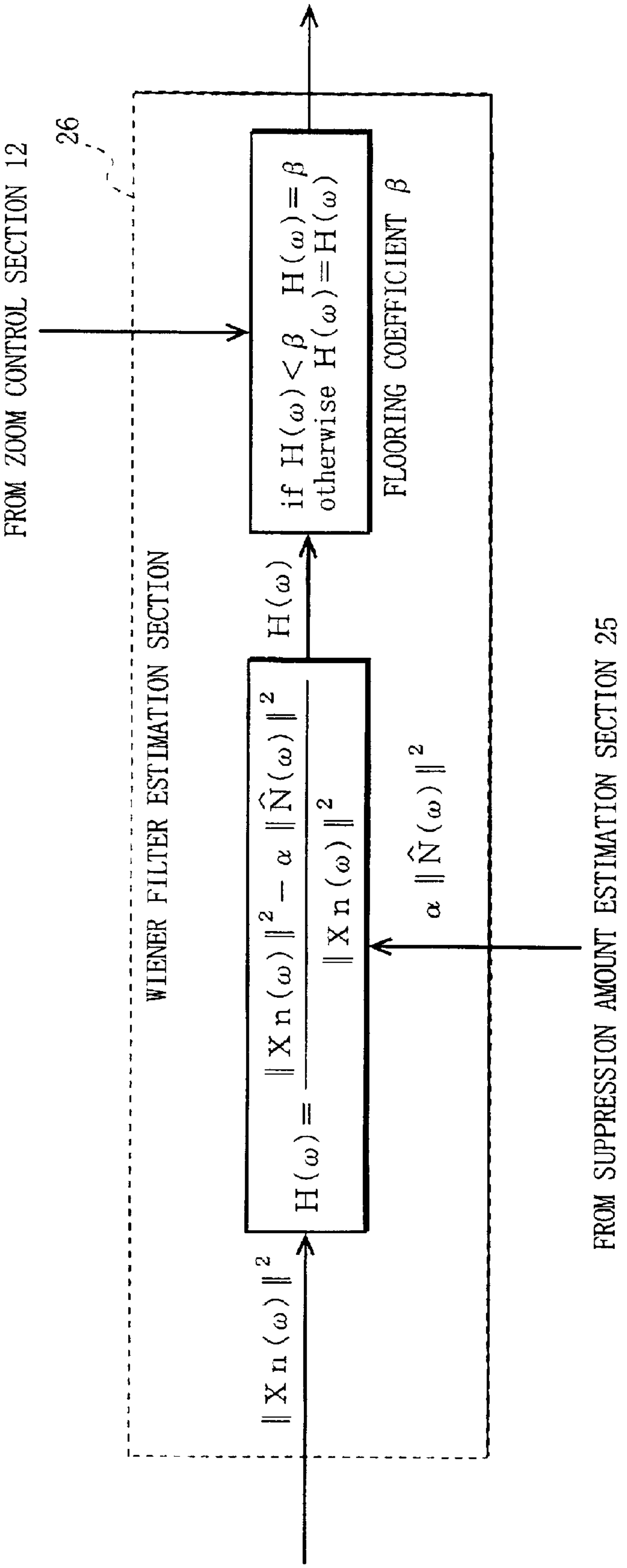
FIG. 2 is a table illustrating an operation of a noise suppression unit.
FIG. 6 is a block diagram illustrating an operation of a Wiener filter estimation section.
Figure 3:
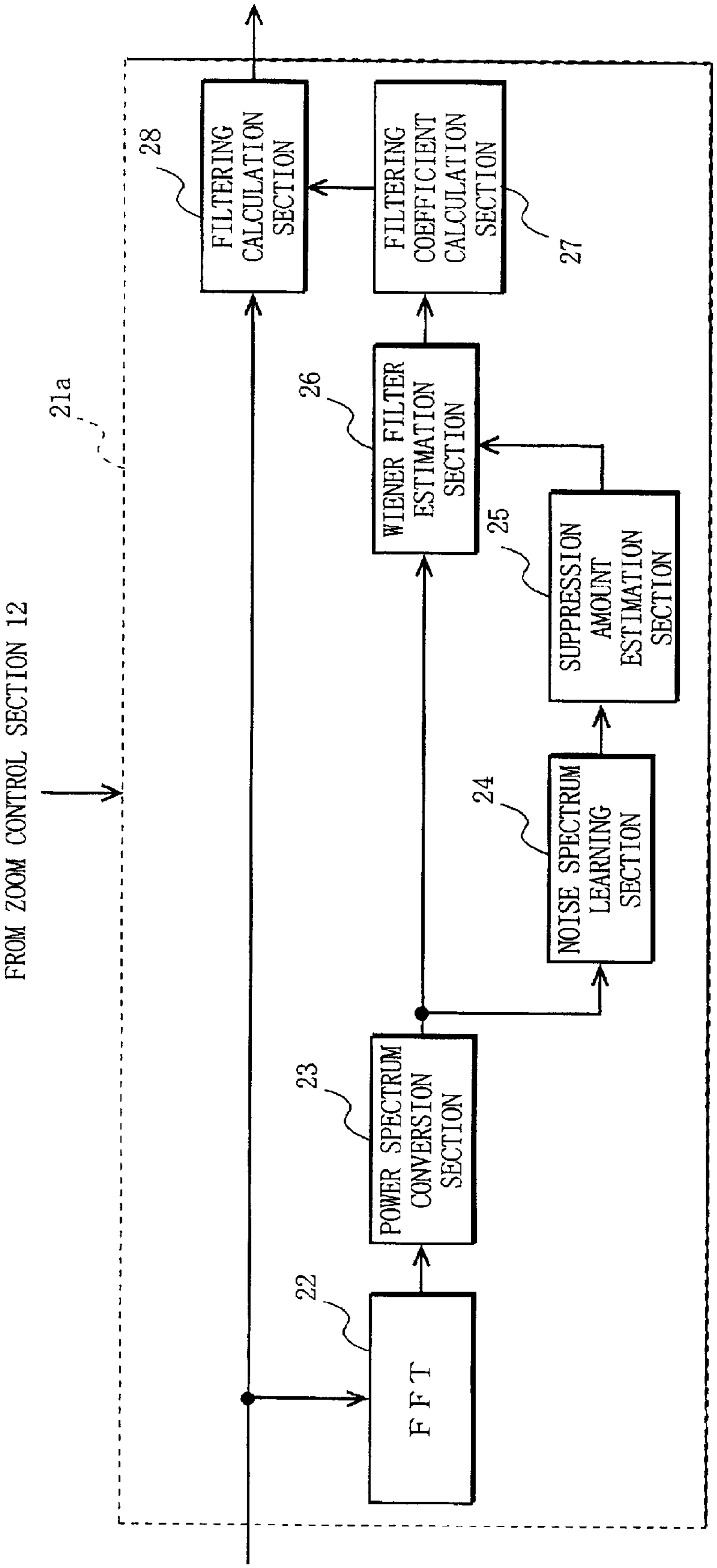
FIG. 3 is a block diagram illustrating an exemplary configuration of a noise suppression unit.

The R channel audio signal and the L channel audio signal which are outputted from the adders 20*a* and 20*b* are supplied to the noise suppression units 21*a* and 21*b*, respectively. The noise suppression units 21*a* and 21*b* suppress the background noise which is contained in the R channel audio signal and the L channel audio signal by a degree which is in accordance with the zoom position signal that is outputted from the zoom control section 12. Specifically, as shown in FIG. 2, the noise suppression units 21*a* and 21*b* applies a greater degree of suppression to the background noise which is contained in the respective channel audio signals under the telescopic operation than under the wide-angle operation. FIG. 3 illustrates an exemplary configuration of the noise suppression unit 21*a*. The exemplary noise suppression unit 21*a* as shown in FIG. 3 is composed essentially of a Wiener filter. Hereinafter, the structure and operation of the noise suppression unit 21*a* will be described with reference to FIG. 3. The noise suppression unit 21*b* has the same structure to that of the noise suppression unit 21*a*, and the description thereof is omitted.

The noise suppression unit 21*a* includes an FFT (fast Fourier transform) 22, a power spectrum conversion section 23, a noise spectrum learning section 24, a suppression amount estimation section 25, a Wiener filter estimation section 26, a filtering coefficient calculation section 27, and a filtering calculation section 28. The R channel audio signal which is outputted from the adder 20*a* of the directivity control section 13 is supplied to the FFT 22 and the filtering calculation section 28. The FFT 22 subjects the audio waveform to a frequency analysis. The power spectrum conversion section 23 calculates a power spectrum of the data which has been subjected to the frequency analysis by the FFT 22. The power spectrum which is outputted from the power spectrum conversion section 23 is provided to the noise spectrum learning section 24 and the Wiener filter estimation section 26. The noise spectrum learning section 24 detects noise regions in the power spectrum which is outputted from the power spectrum conversion section 23 so as to learn (determine) a noise spectrum. Based on the noise spectrum which is outputted from the noise spectrum learning section 24, the suppression amount estimation section 25 determines an amount of noise spectrum that is to be suppressed. The Wiener filter estimation section 26 calculates a ratio between the power spectrum before the noise suppression and the power spectrum after the noise suppression based on the outputs from the power spectrum conversion section 23 and the suppression amount estimation section 25. The filtering coefficient calculation section 27 subjects the aforementioned ratio, i.e., transfer function, to an inverse fast Fourier transform (IFFT) so as to render the ratio back into a waveform on the time axis and to obtain a so-called impulse response. Based on the impulse response which is obtained by the filtering coefficient calculation section 27, the filtering calculation section 28 filters the audio waveform of the R channel audio signal. Various methods for obtaining varying degrees of suppression for background noise in accordance with the zoom position signal which is outputted from the zoom control section 12 may be used in the noise suppression unit 21*a* having the above-described configuration. Hereinafter, some typically applicable methods will be described.

Figure 4:
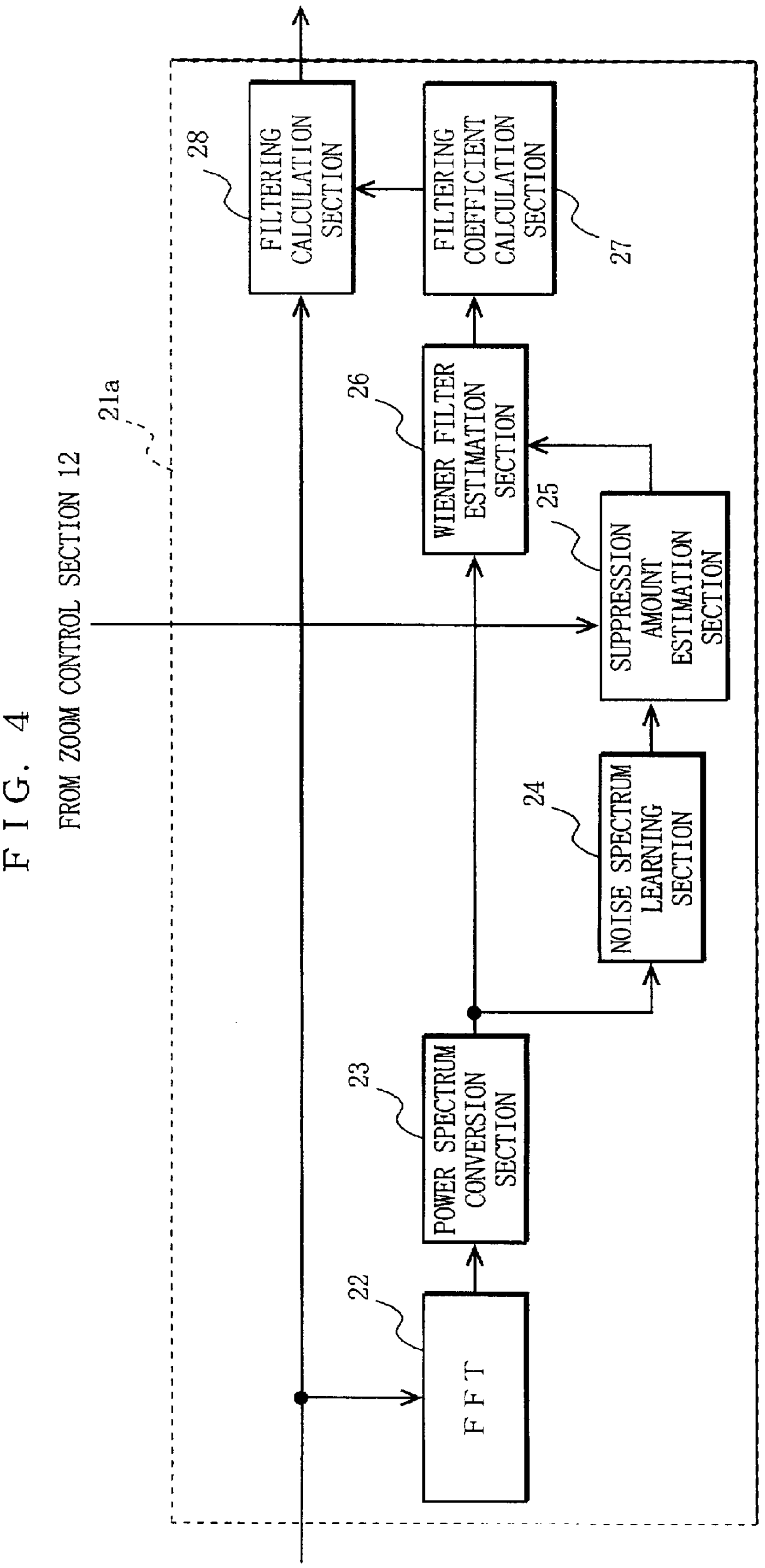
FIG. 4 is a block diagram illustrating an exemplary configuration of a noise suppression unit.

A first example may be a method which involves controlling the suppression amount estimation section 25 based on the zoom position signal which is outputted from the zoom control section 12 as shown by an incoming arrow in FIG. 4. Specifically, a variable a in eq. 1 below, which is a parameter for adjusting the amount of suppression, is controlled in accordance with the $$\hat{H}(\omega) = \frac{\|X(\omega)\|^2 - \alpha\left\|\hat{N}(\omega)\right\|^2}{\|X(\omega)\|^2}$$

H(ω): Wiener filter transfer function $\|(\omega)\|^2$ : power spectrum of input signal $\|\hat{N}(\omega)\|^2$ : power spectrum of noise α: parameter for adjusting suppression amount zoom position signal:

In this case, for example, α=0 may be used to provide zero noise suppression, or α=0.1 maybe used to provide relatively little noise suppression under the wide-angle operation. On the other hand, α=0.8 may be used, for example, to provide a greater degree of noise suppression under the telescopic operation.

Figure 5:
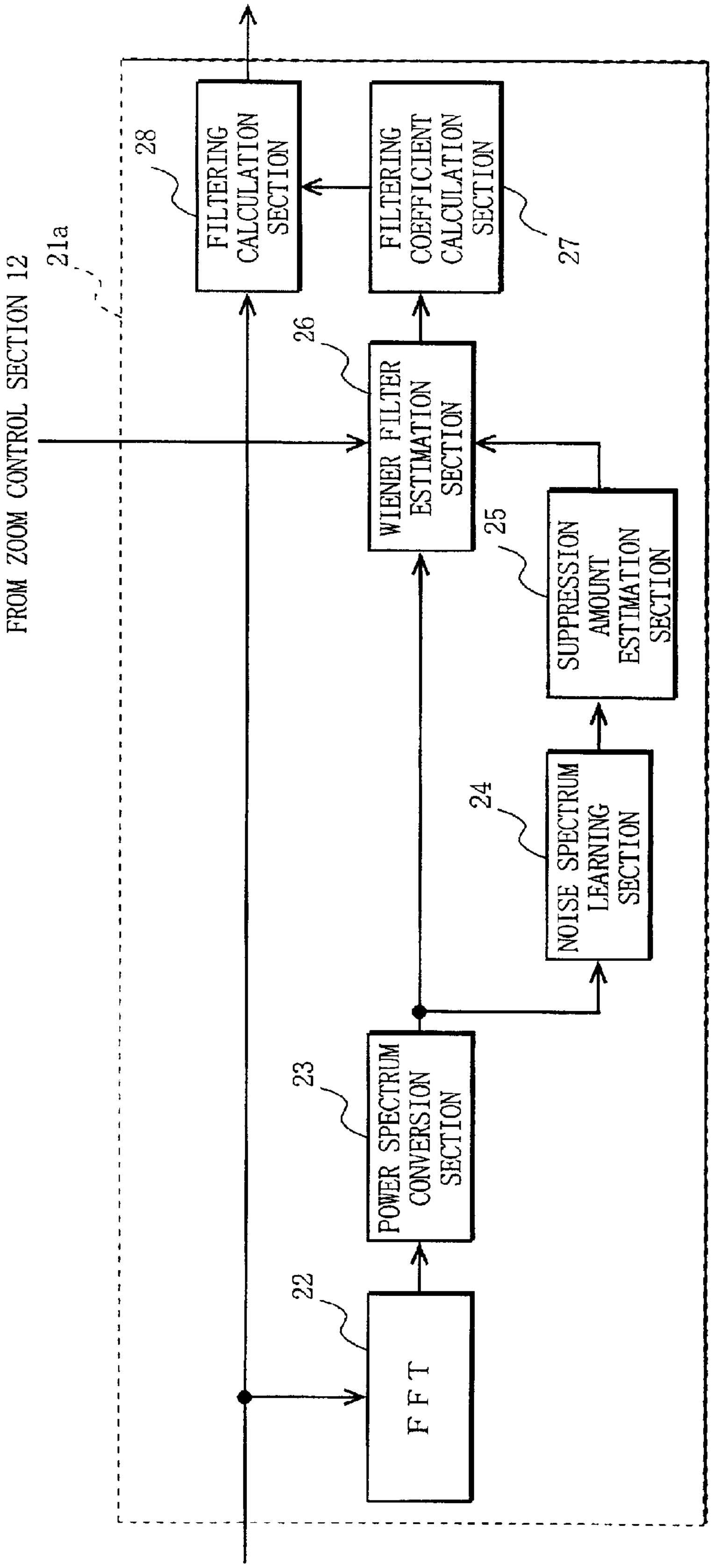
FIG. 5 is a block diagram illustrating an exemplary configuration of a noise suppression unit.

A second example may be a method which involves controlling the Wiener filter estimation section 26 based on the zoom position signal which is outputted from the zoom control section 12 as shown by an incoming arrow in FIG. 5. FIG. 6 is a block diagram illustrating an exemplary configuration of the Wiener filter estimation section 26. In FIG. 6, a variable β is a so-called flooring variable, which is employed to prevent excessive reduction of the noise signal. The flooring variable β is controlled in accordance with the zoom position signal which is outputted from the zoom control section 12. In this case, for example, β=1 may be used to provide zero noise suppression, or β=0.9 may be used to provide relatively little noise suppression under the wide-angle operation. On the other hand, β=0.2 may be used, for example, to provide a greater degree of noise suppression under the telescopic operation.

Figure 7:
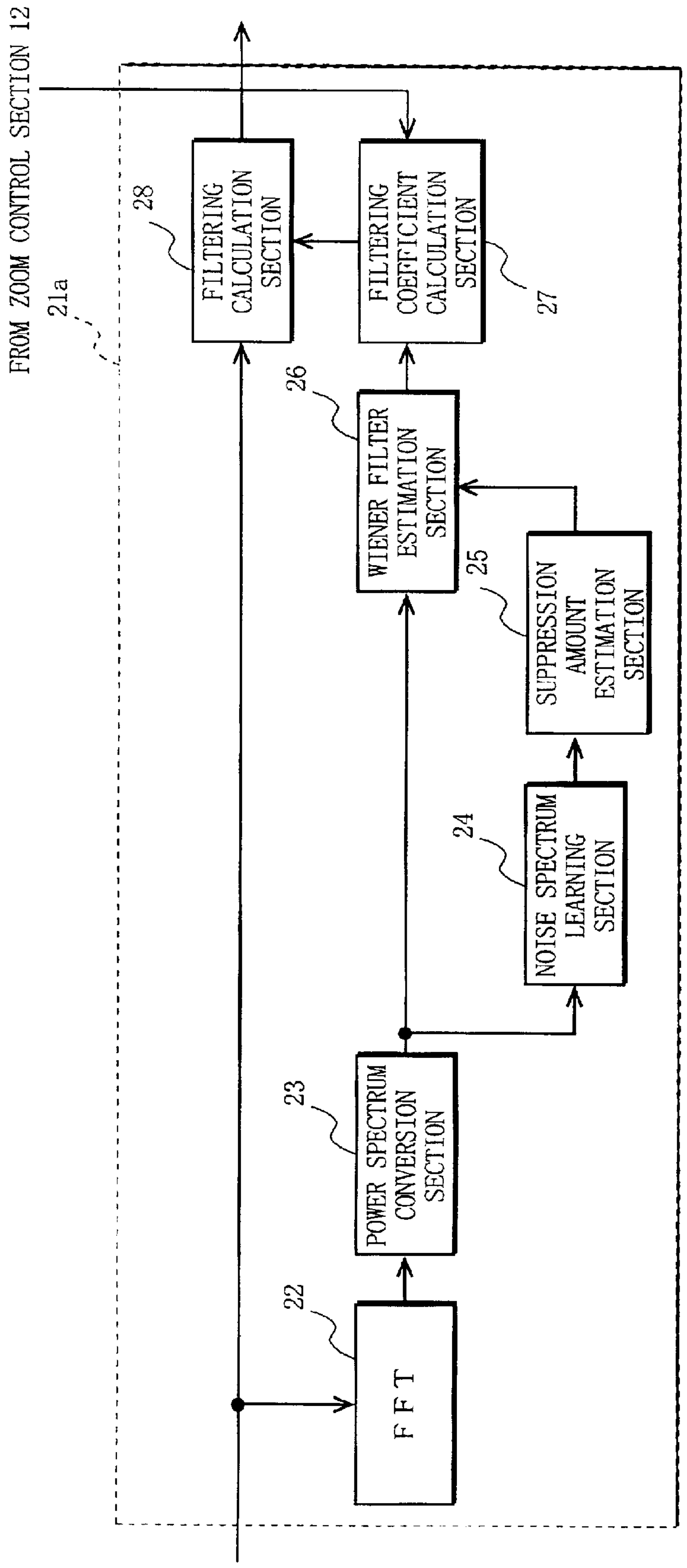
FIG. 7 is a block diagram illustrating an exemplary configuration of a noise suppression unit.
Figure 21:
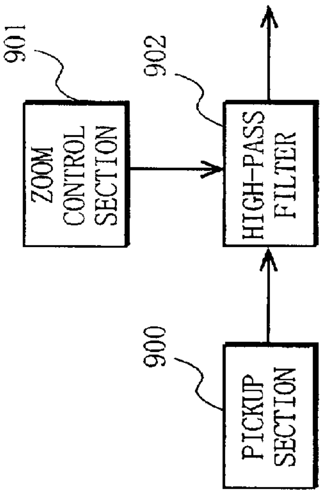
FIG. 21 PRIOR ART
FIG. 21 is a block diagram illustrating the structure of a first conventional example of a zoom microphone device.
Figure 8:
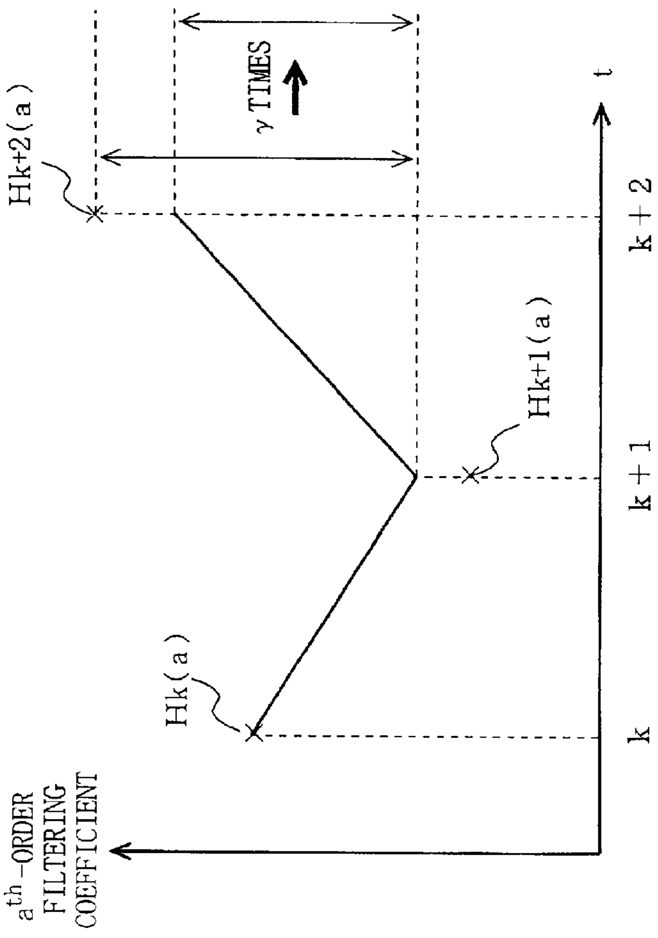
FIG. 8 is a graph illustrating a variable $\gamma$ which represents a rate of change of a filtering coefficient.

A third example may be a method which involves controlling the filtering coefficient calculation section 27 based on the zoom position signal which is outputted from the zoom control section 12 as shown by an incoming arrow in FIG. 7. Specifically, as shown in FIG. 8, a variable $\gamma$, which represents a filtering coefficient of a time-modulated filter, is controlled in accordance with the zoom position signal. In this case, for example, $\gamma=0$ may be used to fix the filtering coefficient, or $\gamma=0.1$ may be used to obtain a minimum rate of change in the filtering coefficient under the wide-angle operation. On the other hand, $\gamma=0.8$ may be used, for example, to obtain a greater rate of change in the filtering coefficient under the telescopic operation.

The noise suppression units 21*a* and 21*b* may be of any configuration so long as the configuration of the noise suppression units 21*a* and 21*b* is capable of applying a varying degree of background noise suppression in accordance with the zoom position signal in the manner as shown in FIG. 2. For example, a spectral subtraction technique, or a frequency sub-band noise suppression technique using a filter bank may be employed instead of the aforementioned noise suppression technique using a Wiener filter.

Referring back to FIG. 1, the R channel audio signal and the L channel audio signal which are respectively outputted from the noise suppression units 21*a* and 21*b* are supplied to the volume control section 15. The volume control section 15 adjusts the power level of these two channel audio signals in accordance with the zoom position signal which is outputted from the zoom control section 12. Specifically, the power level of each R and L channel audio signal is adjusted so that a greater sound volume level is obtained under the telescopic operation than under the wide-angle operation. Since a target sound under the telescopic operation comes from a relatively remote location, the sound volume level of the target sound that is picked up by the pickup section 11 under the telescopic operation is lower than the sound volume level of the target sound that is obtained under the wide-angle operation. Accordingly, the overall sound volume level under the telescopic operation is increased by the volume control section 15 relative to sound volume level under the wide-angle operation. As a result, the target sound under the telescopic operation can be enhanced, thereby allowing the user to perceive the effects of audio zooming. Although the volume control section 15 is not an essential element according to the present invention, it is preferable to provide the volume control section 15 from the perspective of obtaining improved zooming effects.

Figure 9:
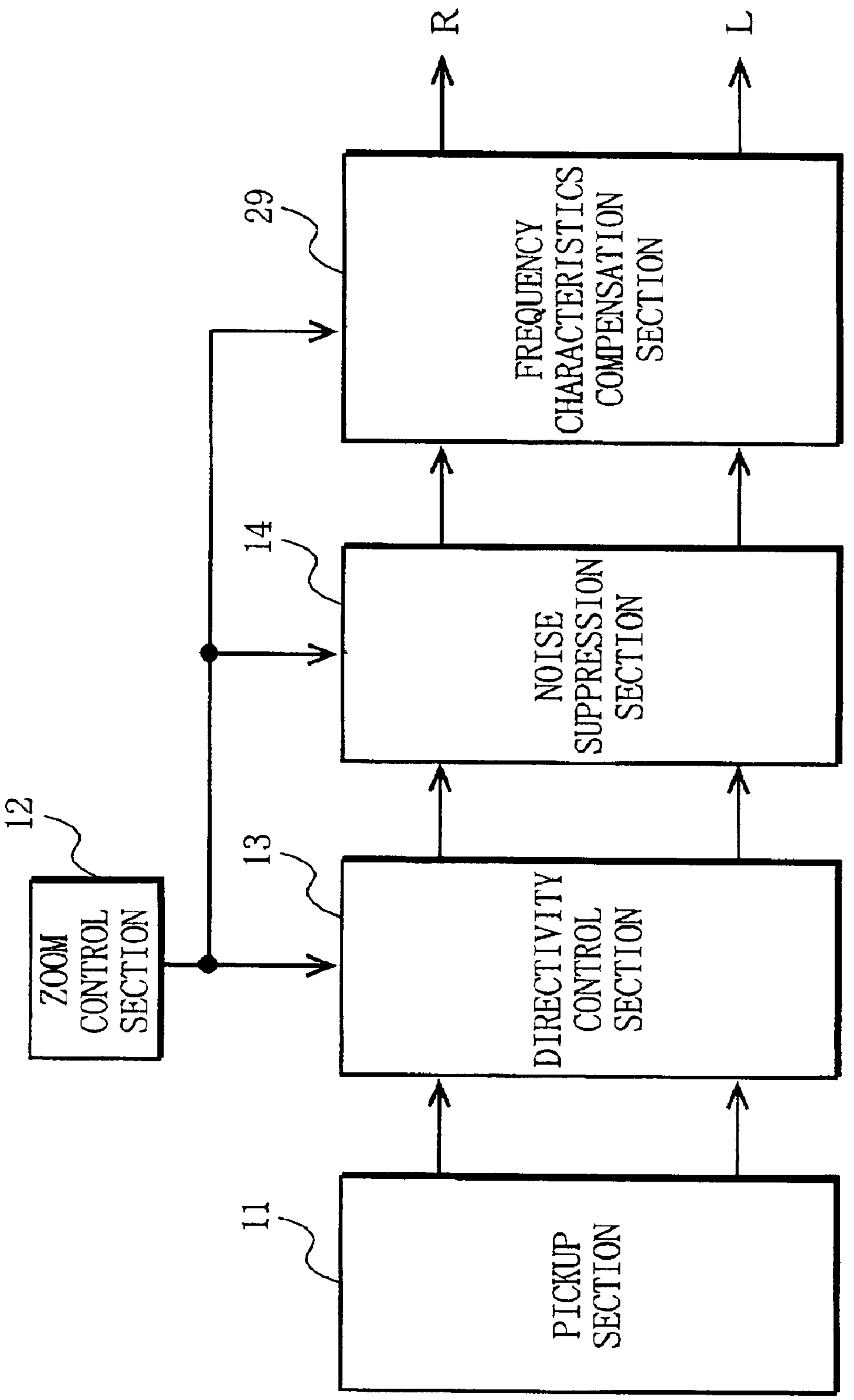
FIG. 9 is a block diagram illustrating a variant of the first embodiment of the present invention.

Optionally, as shown in FIG. 9, a frequency characteristics compensation section 29 may be provided subsequent to the noise suppression section 14, for example. In FIG. 9, component elements which also appear in FIG. 1 are denoted by the same reference numerals as those used therein. The rationale for employing the frequency characteristics compensation section 29 is as follows. There is a known problem in that the frequency characteristics of the audio signal that is outputted from the pickup section 11 may be altered in the course of the signal processing by the directivity control section 13. The frequency characteristics compensation section 29 may be employed so as to compensate for such a change in the frequency characteristics. Since the signal processing operation by the directivity control section 13 is in itself a function of the zoom position signal under the first embodiment, the change in the frequency characteristics also depends on the zoom position signal. Accordingly, in order to maintain the normal frequency characteristics of the audio signal, the frequency characteristics compensation section 29 applies a compensation which is always optimized in accordance with the zoom position signal. Although the frequency characteristics compensation section 29 is not an essential element according to the present invention, it is preferable to provide the frequency characteristics compensation section 29 from the perspective of preventing tone changes.

As described above, according to the first embodiment of the present invention, as the zoom position changes from the wide-angle to telescopic operation, the directivity characteristics are altered so that a remote target sound can be picked up with enhancement, while also elevating the degree of background noise suppression that is to be applied to the sound which is picked up by the zoom microphone device. As a result, as the zoom position changes from the wide-angle to telescopic operation, a more enhanced target sound can be picked up while suppressing the background noise without any perceivable changes in the tone of the target sound. In addition, by increasing the sound volume level of the audio signal in accordance with the change in the zoom position, it is possible to effectively enhance the target sound such that the target sound sounds as if being picked up near the source of the target sound. Since the degree of noise suppression can be elevated corresponding to an increase in the sound volume level of the audio signal, it is possible to prevent the background noise from being boosted with the increase in the sound volume level of the audio signal.

Although the first embodiment illustrates an example where the directivity characteristics are altered so that sounds coming (originating) from the frontal direction of the zoom microphone device can be picked up with enhancement under the telescopic operation, the target sound does not need to originate in the frontal direction. What is essential is to pick up a given target sound, not just the those sounds which come from the frontal direction, with enhancement under the telescopic operation. Since a target sound may not always originate in the frontal direction, it is possible, depending on the particular usage of the zoom microphone device, to alter the directivity characteristics thereof so that a target sound coming from any direction other than the frontal direction can be picked up with enhancement. Furthermore, the directivity characteristics may be dynamically altered so as to “follow” a target sound which comes from constantly varying directions.

The particular configuration of the pickup section 11 and the directivity control section 13 in the first embodiment is only illustrative, and may have a number of variants. For example, the number of microphone units in the pickup section is not limited to two. Moreover, the number of channel audio signals that are outputted from the directivity control section 13 is not limited to two. Hereinafter, such variants of the present invention will be described.

Figure 10:
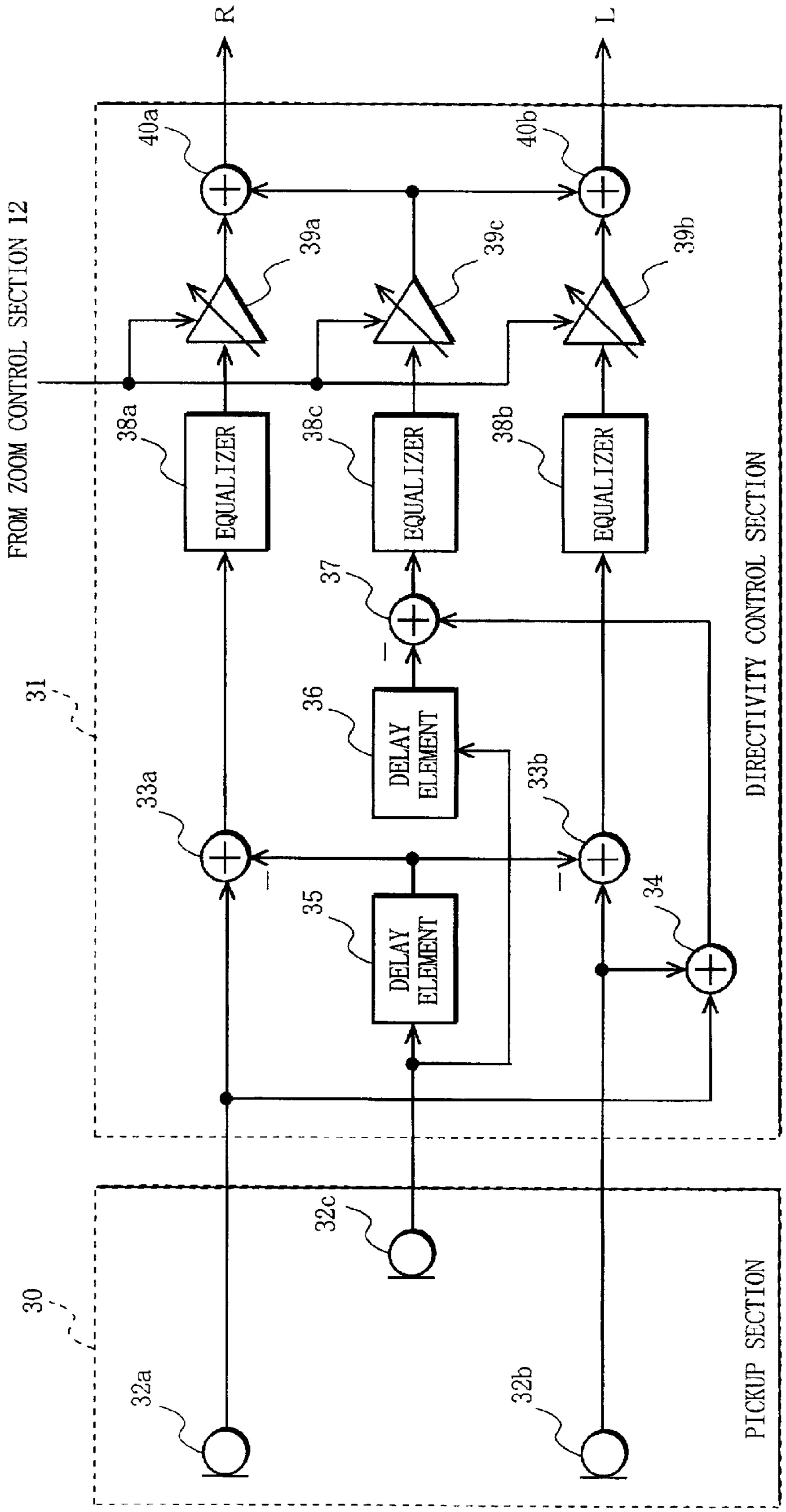
FIG. 10 is a block diagram illustrating some elements constituting a zoom microphone device according to a first variant.

As a first variant, a zoom microphone device as illustrated in FIG. 10 will now be described. In the zoom microphone device of the first variant, the pickup section 11 and the directivity control section 13 according to the first embodiment of the present invention as shown in FIG. 1 are respectively replaced by a pickup section 30 and a directivity control section 31.

Referring to FIG. 10, the pickup section 30 includes microphone units 32*a*, 32*b*, and 32*c*. The directivity control section 31 includes: adders 33*a*, 33*b*, and 34; delay elements 35 and 36; an adder 37; equalizers 38*a*, 38*b*, and 38*c*; amplifiers 39*a*, 39*b*, and 39*c*; and adders 40*a* and 40*b*.

All of the microphone units 32*a*, 32*b*, and 33*c* are non-directional. Each of the microphone units 32*a*, 32*b*, and 33*c* transduces a sound to an audio signal, which is outputted to the directivity control section 31. The delay element 35 delays the audio signal that is outputted from the microphone unit 32c by a period of time which is equal to the amount of time that is required for a given sound wave to propagate over the distance from the microphone unit 32a to the microphone unit 32c. The adder 33a functions so as to subtract the audio signal output of the delay element 35 from the audio signal output of the microphone unit 32a, thereby obtaining a directivity in the direction of the microphone unit 32a from the microphone unit 32c. Similarly, the adder 33b functions so as to subtract the audio signal output of the delay element 35 from the audio signal output of the microphone unit 32b, thereby obtaining a directivity in the direction of the microphone unit 32b from the microphone unit 32c. The adder 34 adds the audio signals that are outputted from the microphone units 32a and 32b. The delay element 36 delays the audio signal that is outputted from the microphone unit 32c by a period of time which is equal to the amount of time that is required for a given sound wave to propagate over the distance from an intermediate point between the microphone units 32a and 32b to the microphone unit 32c. The adder 37 functions so as to subtract the audio signal output of the delay element 36 from the audio signal output of the microphone unit 34, thereby obtaining a directivity in the direction of the intermediate point between the microphone units 32a and 32b from the microphone unit 32c. The equalizers 38a, 38b, and 38c are employed so as to correct the distortion in the amplitude frequency characteristics and any tone changes which may result when an addition/subtraction of an audio signal is performed for the audio signals that are outputted from the adders 33a, 33b, and 37, respectively.

Figure 12:
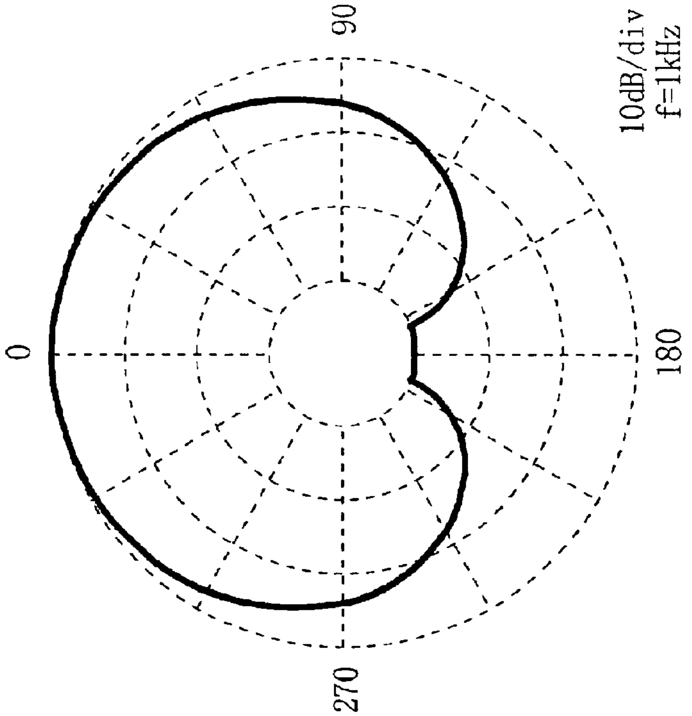
FIG. 12 is a diagram illustrating the directivity characteristics of the zoom microphone device under the telescopic operation according to the first variant.
Figure 11:
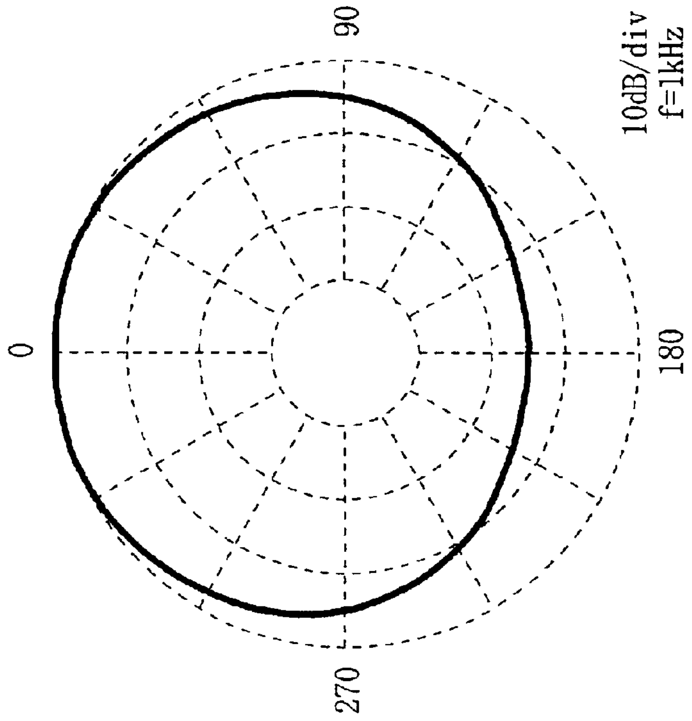
FIG. 11 is a diagram illustrating the directivity characteristics of the zoom microphone device under the telescopic operation according to the first embodiment of the present invention.

Based on the zoom position signal that is outputted from the zoom control section 12, the amplifiers 39a, 39b, and 39c adjust the amplitude of the audio signals which are outputted from the equalizers 38a, 38b, and 38c, respectively. Specifically, under the wide-angle operation, the gain of both of the amplifiers 39a and 39b is set to "1", and the gain of the amplifier 39c is set to "0". On the other hand, under the telescopic operation, the gain of both of the amplifiers 39a and 39b is set to "0", and the gain of the amplifier 39c is set to "1". In the intermediate regions between the wide-angle and telescopic operations, the gain of the amplifiers 39a, 39b, and 39 varies between 0 and 1 in corresponding manners in accordance with the zoom position. The adder 40a adds up the respective audio signals that are outputted from the amplifiers 39a and 39c, and outputs the resultant signal as an R channel audio signal. The adder 40b adds up the respective audio signals that are outputted from the amplifiers 39b and 39c, and outputs the resultant signal as an L channel audio signal. Accordingly, the L-channel and R-channel directivity characteristics gradually shift toward the frontal direction as the zoom position is moved to the telescopic end until the directivity of both channels is aligned with the frontal direction under telescopic operation. In the structure shown in FIG. 1, where two microphone units are used, directivity characteristics as shown in FIG. 11 are obtained under the telescopic operation. On the other hand, in the present variant featuring three microphone units,directivity characteristics as shown in FIG. 12 are obtained under the telescopic operation. In other words, according to the present variant, the directivity in the frontal direction can be sharpened as compared to the directivity in the frontal direction according to the first embodiment as shown in FIG. 1. As a result, a target sound originating in the frontal direction can be picked up with a higher level of enhancement under the telescopic operation according to this variant. Thus, different zooming performances can be obtained depending on the configuration of the pickup section and the directivity control section. The specific configuration may be optimized by the designer of the zoom microphone device while paying attention to other requirements such as cost factors.

Thereafter, the R channel audio signal and L channel audio signal which are respectively outputted from the adders 40a and 40b are subjected to varying degrees of noise suppression by the noise suppression units 21a and 21b, respectively, in accordance with the zoom position signal which is outputted from the zoom control section 12.

Figure 13:
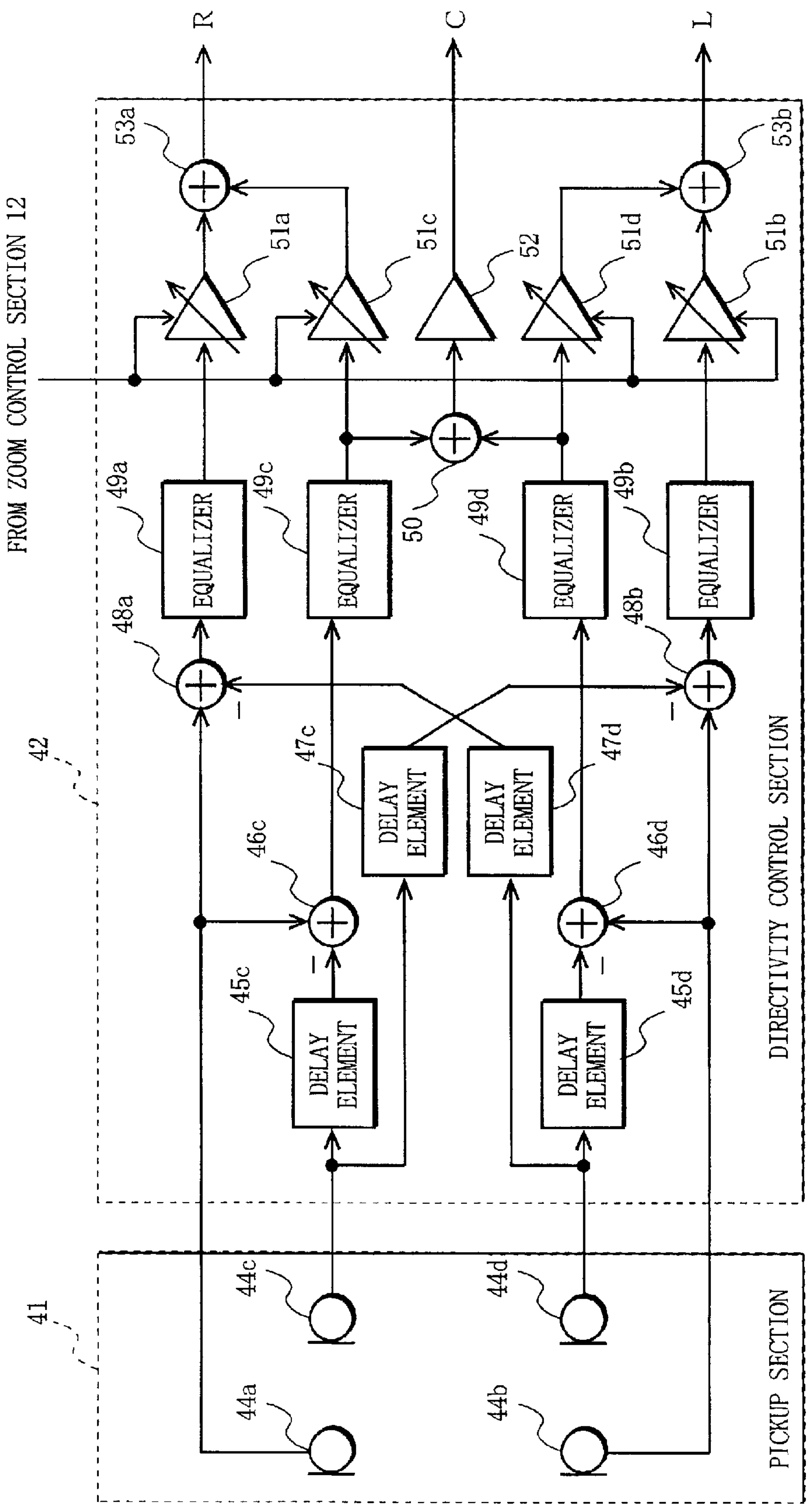
FIG. 13 is a block diagram illustrating some elements constituting a zoom microphone device according to a second variant.
Figure 14:
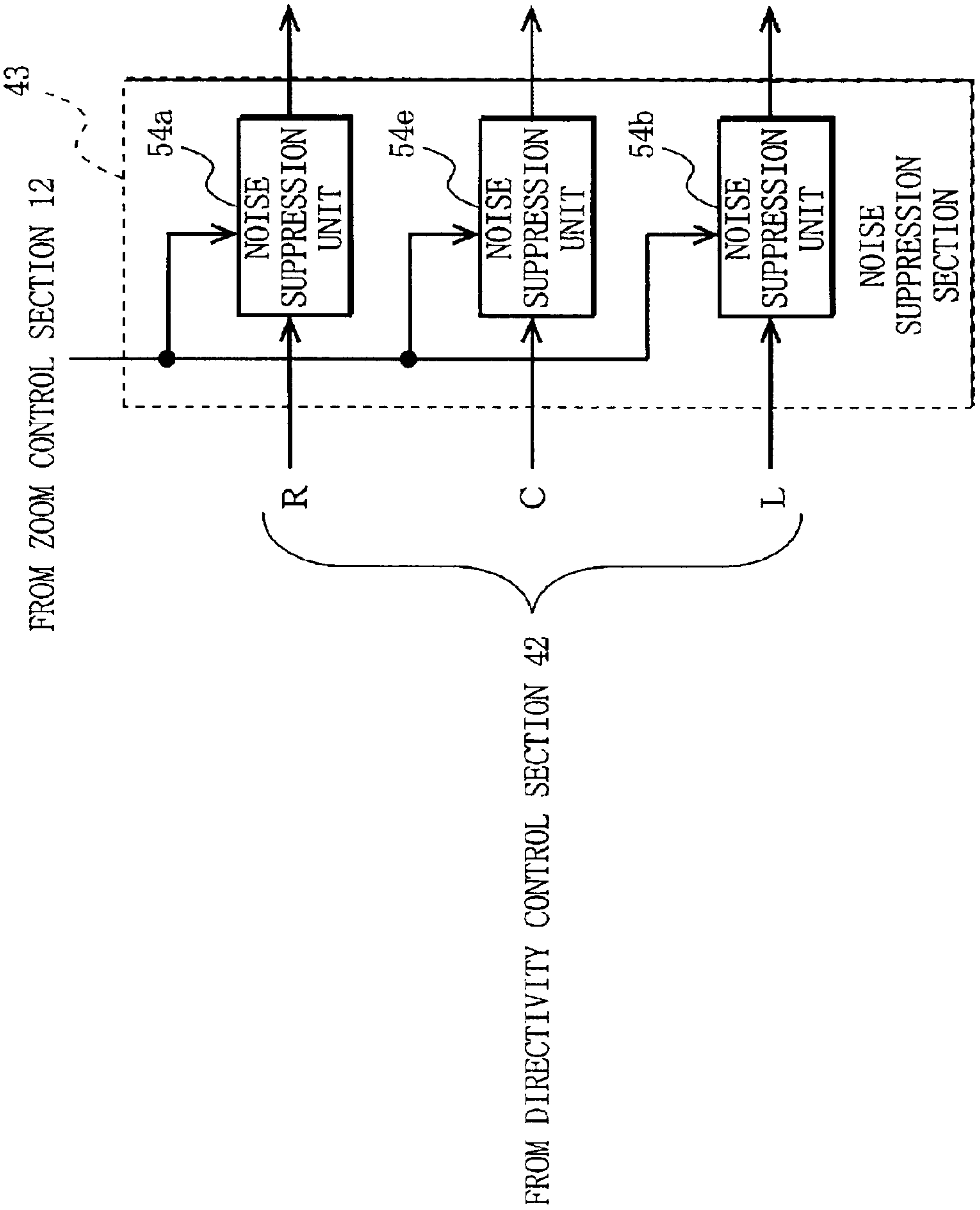
FIG. 14 is a block diagram illustrating some elements constituting the zoom microphone device according to the second variant.

Next, as a second variant, a zoom microphone device as illustrated in FIGS. 13–14 will now be described. In the zoom microphone device of the second variant, the pickup section 11, the directivity control section 13, and the noise suppression section 14 according to the first embodiment of the invention as shown in FIG. 1 are respectively replaced by a pickup section 41 land a directivity control section 42 as shown in FIG. 13 and a noise suppression section 43 as shown in FIG. 14.

Referring to FIG. 13, the pickup section 41 includes microphone units 44a, 44b, 44c, and 44d. The directivity control section 42 includes: delay elements 45c and 45d; adders 46d and 46d; delay elements 47c and 47d; adders 48a and 48b; equalizers 49a, 49b, 49c, and 49d; an adder 50; amplifiers 51a, 51b, 51c, and 51d; an amplifier 52; and adders 53a and 53b. Referring to FIG. 14, the noise suppression section 43 includes noise suppression units 54a, 54b, and 54e.

All of the microphone units 44a, 44b, 44c, and 44d are non-directional. Each of the microphone units 44a, 44b, 44c, and 44d transduces a sound to an audio signal, which is outputted to the directivity control section 42. The delay element 45c delays the audio signal that is outputted from the microphone unit 44c by a period of time which is equal to the amount of time that is required for a given sound wave to propagate over the distance from the microphone unit 44a to the microphone unit 44c. The adder 46c functions so as to subtract the audio signal output of the delay element 45c from the audio signal output of the microphone unit 44a, thereby obtaining a directivity in the direction of the microphone unit 44a from the microphone unit 44c. The delay element delays the audio signal that is outputted from the microphone unit 44d by a period of time which is equal to the amount of time that is required for a given sound wave to propagate over the distance from the microphone unit 44b to the microphone unit 44d. The adder 46d functions so as to subtract the audio signal output of the delay element 45d from the audio signal output of the microphone unit 44b, thereby obtaining a directivity in the direction of the microphone unit 44b from the microphone unit 44d. The delay element 47c delays the audio signal that is outputted from the microphone unit 44c by a period of time which is equal to the amount of time that is required for a given sound wave to propagate over the distance from the microphone unit 44b to the microphone unit 44c. The adder 48d functions so as to subtract the audio signal output of the delay element 47c from the audio signal output of the microphone unit 44b, thereby obtaining a directivity in the direction of the microphone unit 44b from the microphone unit 44c. The delay element 47d delays the audio signal that is outputted from the microphone unit 44d by a period of time which is equal to the amount of time that is required for a given sound wave to propagate over the distance from the microphone unit 44a to the microphone unit 44d. The adder 48a functions so as to subtract the audio signal output of the delay element 47d from the audio signal output of the microphone unit 44a, thereby obtaining a directivity in the direction of the microphone unit 44*a* from the microphone unit 44*d*. The equalizers 49*a*, 49*b*, 49*c*, and 49*d* are employed so as to correct the distortion in the amplitude frequency characteristics and tone changes which may result when an addition/subtraction of an audio signal is performed for the audio signals that are outputted from the adders 48*a*, 48*b*, 46*c*, and 46*d*, respectively.

The adder 50 adds the audio signals which are outputted from the equalizers 49*c* and 49*d*. Based on the zoom position signal which is outputted from the zoom control section 12, the amplifiers 51*a*, 51*b*, 51*c*, and 51*d* adjust the amplitude of the audio signals which are outputted from the equalizers 49*a*, 49*b*, 49*c*, and 49*d*, respectively. Specifically, under the wide-angle operation, the gain of both of the amplifiers 51*a* and 51*b* is set to "1", and the gain of both of the amplifiers 51*c* and 51*d* is set to "0". On the other hand, under the telescopic operation, the gain of both of the amplifiers 51*a* and 51*b* is set to "0", and the gain of both of the amplifiers 51*c* and 51*d* is set to "1". In the intermediate regions between the wide-angle and telescopic operations, the gain of the amplifiers 51*a*, 51*b*, 51*c*, and 51*d* varies between 0 and 1 in corresponding manners in accordance with the zoom position. The amplifier 52 multiplies the amplitude of the audio signal that is outputted from the adder 50 by 0.5, and outputs the resultant signal as a C (center) channel audio signal. The adder 53*a* adds the respective audio signals that are outputted from the amplifiers 51*a* and 51*c*, and outputs the resultant signal as an R channel audio signal. The adder 53*b* adds the respective audio signals that are outputted from the amplifiers 51*b* and 51*d*, and outputs the resultant signal as an L channel audio signal. Accordingly, the L-channel and R-channel directivity characteristics gradually shift toward the frontal direction as the zoom position is moved to the telescopic end until the directivity of both channels is aligned with the frontal direction under the telescopic operation.

Thereafter, the R channel audio signal, the L channel audio signal, and the C channel audio signal which are respectively outputted from the adders 53*a* and 53*b* and the amplifier 52 are subjected to varying degrees of noise suppression by the noise suppression units 54*a*, 54*b*, and 54*e* as shown in FIG. 14, respectively, in accordance with the zoom position signal which is outputted from the zoom control section 12.

Figure 15:
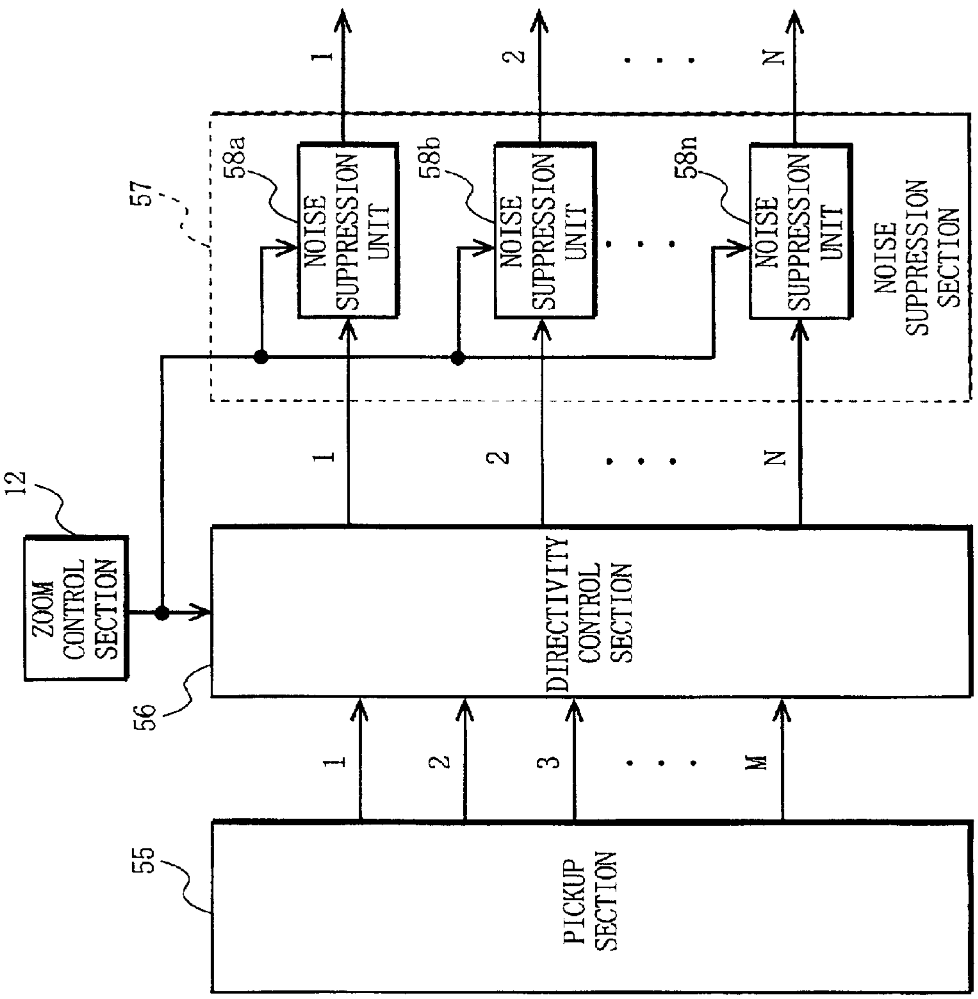
FIG. 15 is a block diagram showing a generalized structure of the zoom microphone device according to the first embodiment of the present invention.

Thus, according to the first embodiment of the present invention, the number of microphone units in the pickup section is not limited to two, and the number of channel audio signals that are outputted from the directivity control section is not limited to two. FIG. 15 shows a generalized structure of the zoom microphone device according to the first embodiment of the present invention. The zoom microphone device shown in FIG. 15 includes: a pickup section 55 which transduces sounds to M output audio signals; a zoom control section 12 for outputting a zoom position signal; a directivity control section 56 for outputting N channel audio signals while varying the directivity characteristics of the zoom microphone device in accordance with the zoom position signal which is outputted from the zoom control section 12; and a noise suppression section 57 which includes N noise suppression units 58*a*, 58*b*, . . . , 58*n* respectively corresponding to the N channel audio signals that are outputted from the directivity control section 56. The first embodiment is characterized by the noise suppression which is performed for the respective channel audio signals in accordance with the zoom position. As summarized in FIG. 15, the number M of audio signals to be outputted from the pickup section 55 and the number N of channel audio signals to be outputted from the directivity control section 56 can be arbitrarily selected.

Although the noise suppression units according to the first embodiment are provided so as to correspond to the respective channel audio signals that are outputted from the directivity control section 56, the noise suppression units may alternatively be provided in various other locations. For example, the noise suppression units may be provided so as to correspond to the audio signals which are outputted from the pickup section 55, or to the audio signals which are exchanged between various elements within the directivity control section 56. Although each noise suppression unit according to the first embodiment is employed so as to correspond to one channel, the present invention is not limited to such a configuration; rather, each noise suppression unit may be employed so as to correspond to more than one channel.

Thus, according to the first embodiment of the present invention, the directivity characteristics of the zoom microphone device are altered so that sounds which generally come from the direction of a target sound can be picked up under the telescopic operation, and the background noise which is contained in the sounds that are picked up is subjected to a greater degree of suppression under the telescopic operation than under the wide-angle operation. As a result, as the zoom position changes from the wide-angle to telescopic operation, a more enhanced target sound can be picked up without any perceivable changes in the tone of the target sound. In addition, by increasing the sound volume level of the audio signal especially under the telescopic operation, it is possible to effectively enhance the target sound such that the target sound sounds as if the target sound is being picked up near the source of the sound. Since a greater degree of noise suppression is applied under the telescopic operation than under the wide-angle operation, it is therefore possible to prevent the background noise from being boosted with zooming-in.

Second Embodiment

In the first embodiment of the present invention as described above, noise suppression is individually applied to each audio channel. A second embodiment of the present invention will now be described in which some of the elements constituting the noise suppression units which are provided for the respective audio channels according to the first embodiment are shared among a plurality of channels, thereby simplifying the structure and processing of the zoom microphone device.

Figure 16:
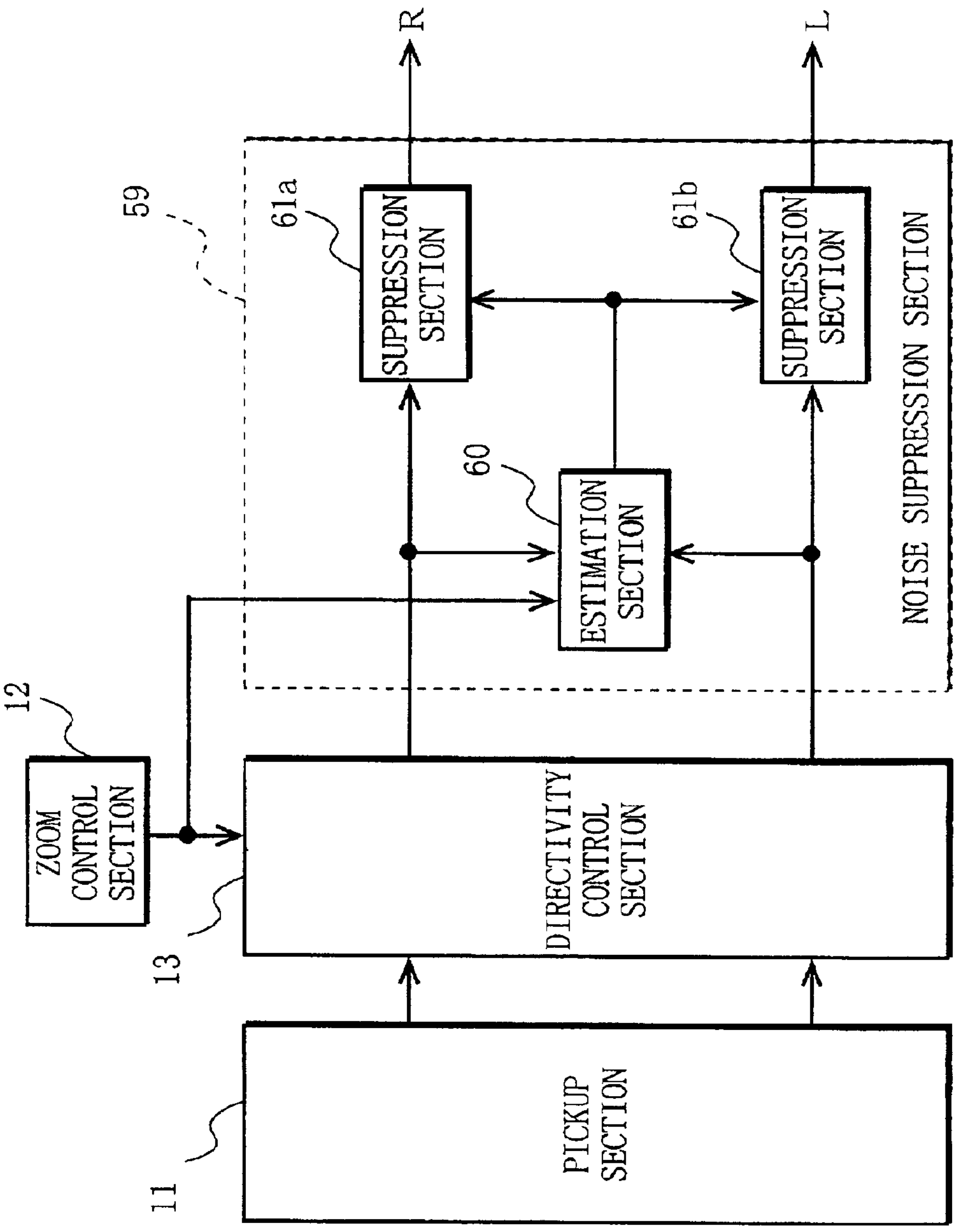
FIG. 16 is a block diagram illustrating the structure of a zoom microphone device according to a second embodiment of the present invention.

FIG. 16 illustrates the structure of the zoom microphone device according to the second embodiment of the present invention. The zoom microphone device of the second embodiment includes a pickup section 11, a zoom control section 12, a directivity control section 13, and a noise suppression section 59. The noise suppression section 59 includes an estimation section 60 and suppression sections 61*a* and 61*b*. In FIG. 16, component elements which also appear in FIG. 1 are denoted by the same reference numerals as those used therein, and the descriptions thereof are omitted.

The directivity control section 13 changes the directivity characteristics of the zoom microphone device in accordance with a zoom position signal which is outputted from the zoom control section 12 so as to output an R channel audio signal and an L channel audio signal. The R channel audio signal which is outputted from the directivity control section 13 is supplied to the estimation section 60 and the suppression section 61*a*. The L channel audio signal which is outputted from the directivity control section 13 is supplied to the estimation section 60 and the suppression section 61*b*.

Figure 17:
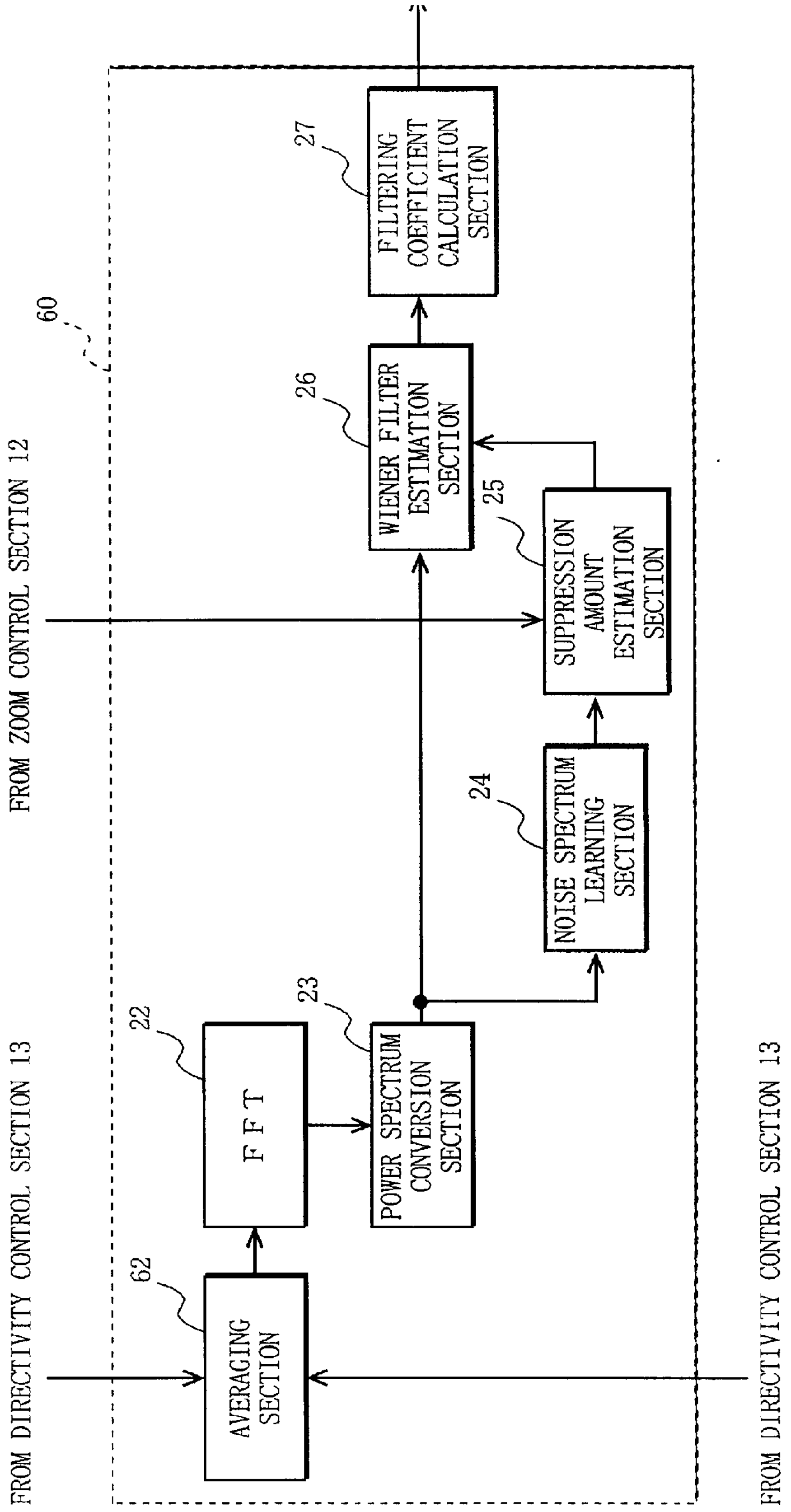
FIG. 17 is a block diagram illustrating an exemplary structure of an estimation section.

FIG. 17 illustrates an exemplary configuration of the estimation section 60. The estimation section 60 includes an averaging section 62, an FFT 22, a power spectrum conversion section 23, a noise spectrum learning section 24, a suppression amount estimation section 25, a Wiener filter estimation section 26, and a filtering coefficient calculation section 27. In FIG. 17, component elements which also appear in FIG. 4 are denoted by the same reference numerals as those used therein, and the descriptions thereof are omitted. The averaging section 62 averages the R channel audio signal and the L channel audio signal which are outputted from the directivity control section 13 so as to generate one audio signal output. In the subsequent elements of the estimation section 60, various processes are performed based on this audio signal that is generated in the averaging section 62 until an impulse response for suppressing background noise by a degree which is in accordance with the zoom position signal is obtained in the filtering coefficient calculation section 27.

In FIG. 16, the suppression sections 61*a* and 61*b* (which may have the same structure as the structure of the filtering calculation section 28 as shown in FIG. 4, for example) suppress the background noise that is contained in the R channel audio signal and the L channel audio signal, respectively, in accordance with the impulse response which is obtained in the filtering coefficient calculation section 27.

Thus, according to the second embodiment of the present invention, the suppression amount for the noise that is contained in the respective channel audio signals is-determined based on a single channel audio signal which is obtained by averaging a number of channel audio signals, instead of individually performing noise suppression for each channel audio signal. As a result, the device structure of the zoom microphone device can be simplified, and the processing load which is required for the noise suppression can be reduced.

Although the estimation section 60 according to the second embodiment is illustrated as determining the noise suppression amount in accordance with an audio signal which is obtained by averaging two channel audio signals, i.e., by averaging the R channel audio signal and the L channel audio signal, the present invention is not limited to such a configuration. For example, a noise suppression amount may be determined based on an audio signal which is obtained by mixing these two channel audio signals at an arbitrary ratio. Alternatively, a noise suppression amount may be determined based on only one of the two channel audio signals. However, in view of the possibility that noise suppression amounts which are individually determined for the R channel audio signal and the L channel audio signal may greatly differ from each other, it is preferable to apply a noise suppression in accordance with an audio signal which is obtained by averaging the respective channel audio signals so as to realize an optimum noise suppression.

Thus, according to the second embodiment, some of the elements constituting the noise suppression units which are provided for the respective audio channels according to the first embodiment are shared among a plurality of channels, thereby simplifying the structure and processing of the zoom microphone device. The specific structure of the estimation section 60 and the suppression sections 61 and 62*a* may vary depending on which elements are shared. For example, the filtering coefficient calculation section 27 as shown in FIG. 17 may be provided in each of the suppression sections 61*a* and 61*b*. Although the zoom position signal which is outputted from the zoom control section 12 is utilized for controlling the suppression amount estimation section 25 according to the second embodiment, the present invention is not limited to such a configuration. The zoom microphone device may be modified in any manner so long as a greater degree of noise suppression is applied under the telescopic operation than under the wide-angle operation through a control based on the zoom position signal. Therefore, depending on the structure of the estimation section and the suppression section, the zoom position signal which is outputted from the zoom control section 12 may be supplied to each suppression section.

As mentioned above in the description of the first embodiment, the estimation section 60 and the suppression sections 61*a* and 61*b* may be of any configuration so long as the configuration is capable of applying a varying degree of background noise suppression in accordance with the zoom position signal in the manner as shown in FIG. 2. For example, a spectral subtraction technique, or a frequency sub-band noise suppression technique using a filter bank may be employed instead of the aforementioned noise suppression technique using a Wiener filter.

Figure 18:
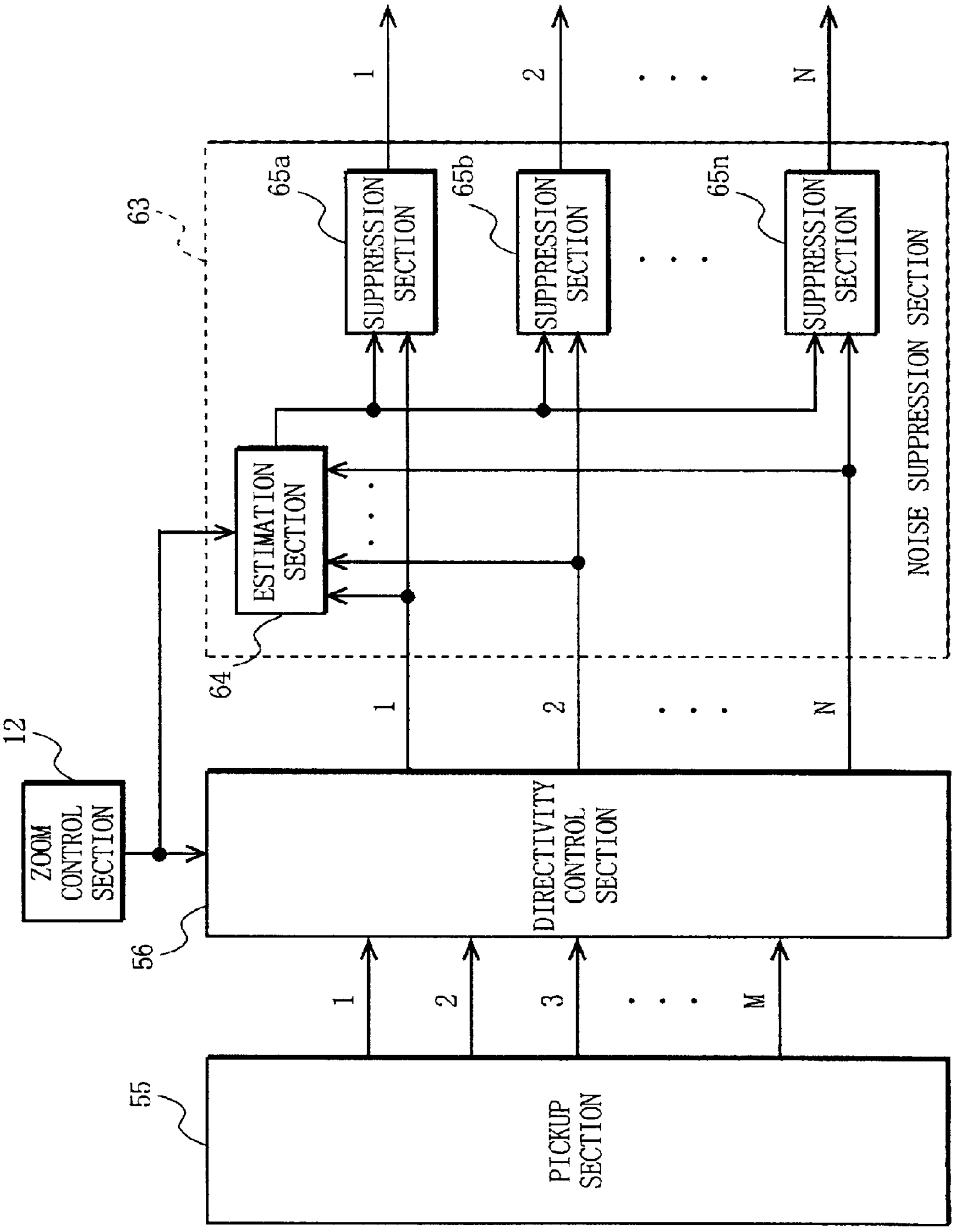
FIG. 18 is a block diagram showing a generalized structure of the zoom microphone device according to the second embodiment of the present invention.

As mentioned above in the description of the first embodiment, the structure of the pickup section 11 and the directivity control section 13 may be modified in various manners. FIG. 18 shows a generalized structure of the zoom microphone device according to the second embodiment of the present invention. The zoom microphone device shown in FIG. 18 includes: a pickup section 55 which transduces sounds to M output audio signals; a zoom control section 12 for outputting a zoom position signal which is in accordance with a zoom position; a directivity control section 56 for outputting N channel audio signals while varying the directivity characteristics of the zoom microphone device in accordance with the zoom position signal which is outputted from the zoom control section 12; an estimation section 64 for estimating a noise spectrum based on at least one of the N channel audio signals; and N suppression sections for respectively suppressing the background noise that is contained in the respective channel audio signals based on the output from the estimation section 64, i.e., the estimated noise spectrum. The second embodiment is characterized in that some of the elements constituting the noise suppression unit are shared among a plurality of channels. As summarized in FIG. 18, the number M of audio signals to be outputted from the pickup section 55 and the number N of channel audio signals to be outputted from the directivity control section 56 can be arbitrarily selected.

Third Embodiment

In the first and second embodiments of the present invention as described above, the background noise in channel audio signals is suppressed by a degree which is in accordance with the zoom position by using various combinations of noise suppression units, an estimation section, and/or a suppression section. A third embodiment of the present invention will now be described in which the background noise that is contained in a target sound signal (described later) is suppressed by a predetermined degree, and the target sound signal whose background noise has been suppressed is mixed with other audio signals at a ratio which is in accordance with a zoom position signal so that the background noise that is contained in the channel audio signals is effectively suppressed by a degree which is in accordance with the zoom position signal. Thus, the structure and processing of the zoom microphone device is further simplified according to the third embodiment of the present invention.

Figure 19:
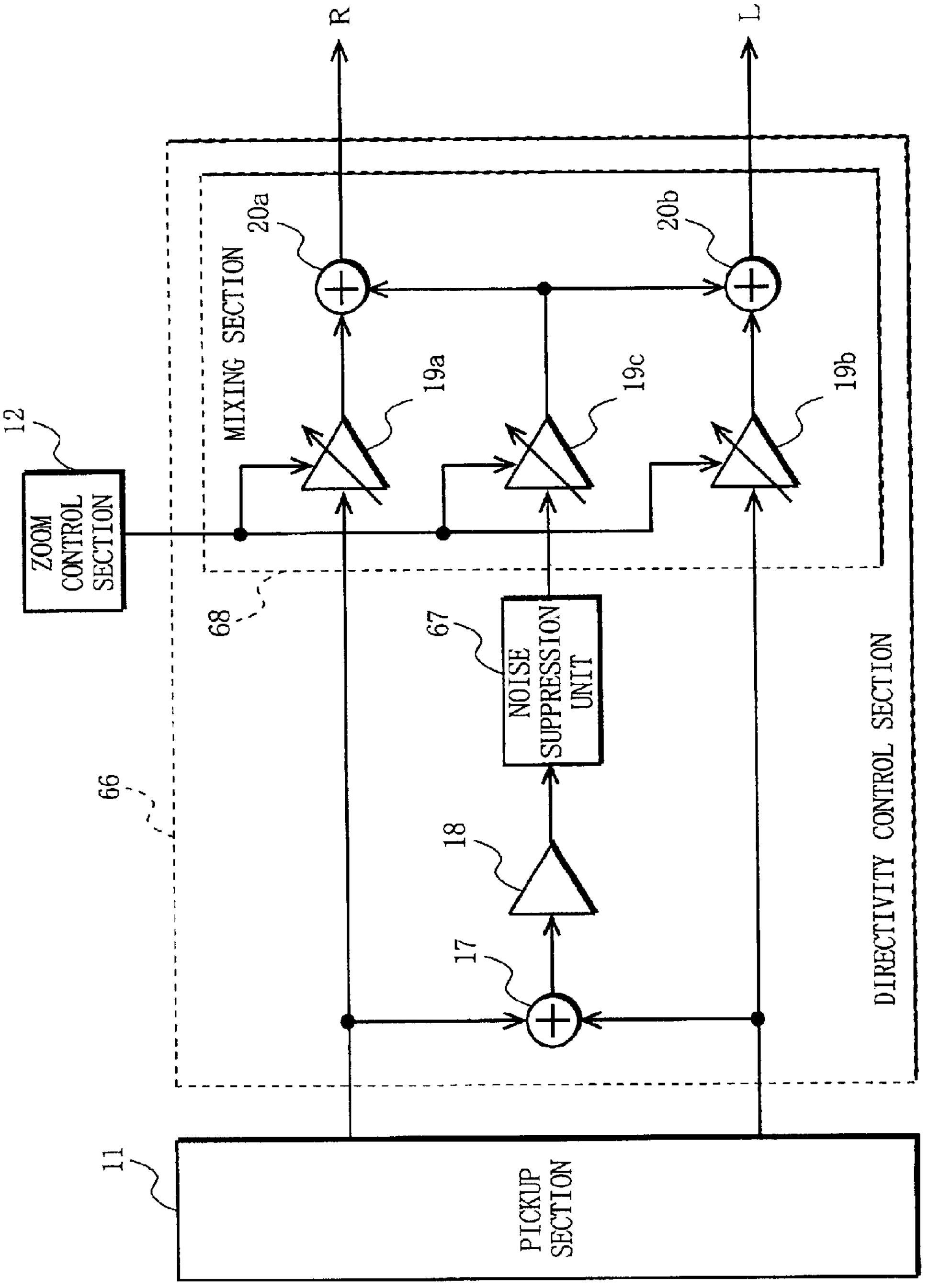
FIG. 19 is a block diagram illustrating the structure of a zoom microphone device according to a third embodiment of the present invention.

FIG. 19 illustrates the structure of a zoom microphone device according to the third embodiment of the present invention. The zoom microphone device of the third embodiment includes a pickup section 11, a zoom control section 12, and a directivity control section 66. The directivity control section 66 includes an adder 17, an amplifier 18, a noise suppression unit 67, and a mixing section 68. The mixing section 68 includes amplifiers 19*a*, 19*b*, and 19*c* and adders 20*a* and 20*b*. In FIG. 19, component elements which also appear in FIG. 1 are denoted by the same reference numerals as those used therein, and the descriptions thereof are omitted.

The pickup section 11 transduces sounds to two separate output audio signals. One of the two audio signals is supplied to the adder 17 and the amplifier 19*a*, whereas the other audio signal is supplied to the adder 17 and the amplifier 19*b*. The adder 17 adds the two audio signals which are outputted from the pickup section 11, and outputs an audio signal (hereinafter referred to as a "target sound signal") which mainly contains sounds originating in the direction of a target sound under the telescopic operation. The amplifier 18 multiplies the amplitude of the target sound signal by 0.5. The target sound signal which is outputted from the amplifier 18 is supplied to the noise suppression unit 67. The noise suppression unit 67 suppresses the background noise that is contained in the target sound signal by a predetermined degree. The two audio signals which are outputted from the pickup section 11 and the target sound signal which is outputted from the noise suppression unit 67 are supplied to the mixing section 68. The mixing section 68 mixes these three signals at a predetermined ratio which is in accordance with the zoom position signal which is outputted from the zoom control section 12, thereby generating and outputting an R channel audio signal and an L channel audio signal.

The mechanism as to how the background noise in the channel audio signals is suppressed by a degree which is in accordance with the zoom position signal through the above operation will now be described. Under the wide-angle operation, the gains of the amplifiers 19*a*, 19*b*, and 19*c* may be set to, for example, "1", "1", and "0", respectively. In other words, the R channel audio signal and the L channel audio signal which are outputted from the directivity control section 66 under wide-angle operation are the two audio signals which are outputted from the pickup section 11, to which no noise suppression has been applied. On the other hand, under the telescopic operation , the gains of the amplifiers 19*a*, 19*b*, and 19*c* may be set to, for example, "0", "0", and "1", respectively. In other words, each of the R channel audio signal and the L channel audio signal which are outputted from the directivity control section 66 under the telescopic operation is the target sound signal which is outputted from the noise suppression unit 67, to which a predetermined degree of noise suppression has been applied by the noise suppression unit 67. At any intermediate zoom position between wide-angle and telescopic operations, the R channel audio signal and the L channel audio signal which are outputted from the directivity control section 66 are mixtures of the two audio signals which are outputted from the pickup section 11 and the target sound signal which is outputted from the noise suppression unit 67 at a predetermined ratio. Thus, it can be seen that the relationship between the zoom position and the noise suppression degree as shown in FIG. 2 exists in the two channel audio signals which are outputted from the directivity control section 66.

As described above, according to the third embodiment of the present invention, it is possible to apply a greater degree of background noise suppression under the telescopic operation than under the wide-angle operation without the need for a plurality of noise suppression units 67 and without directly controlling the degree of noise suppression which is applied by the noise suppression unit 67 based on the zoom position signal that is outputted from the zoom control section 12. As a result, the device structure can be further simplified, and the processing load which is required for the noise suppression can be further reduced.

As the noise suppression unit 67, the aforementioned noise suppression technique using a Wiener filter, a spectral subtraction technique, or a frequency sub-band noise suppression technique using a filter bank may be employed, for example.

Figure 20:
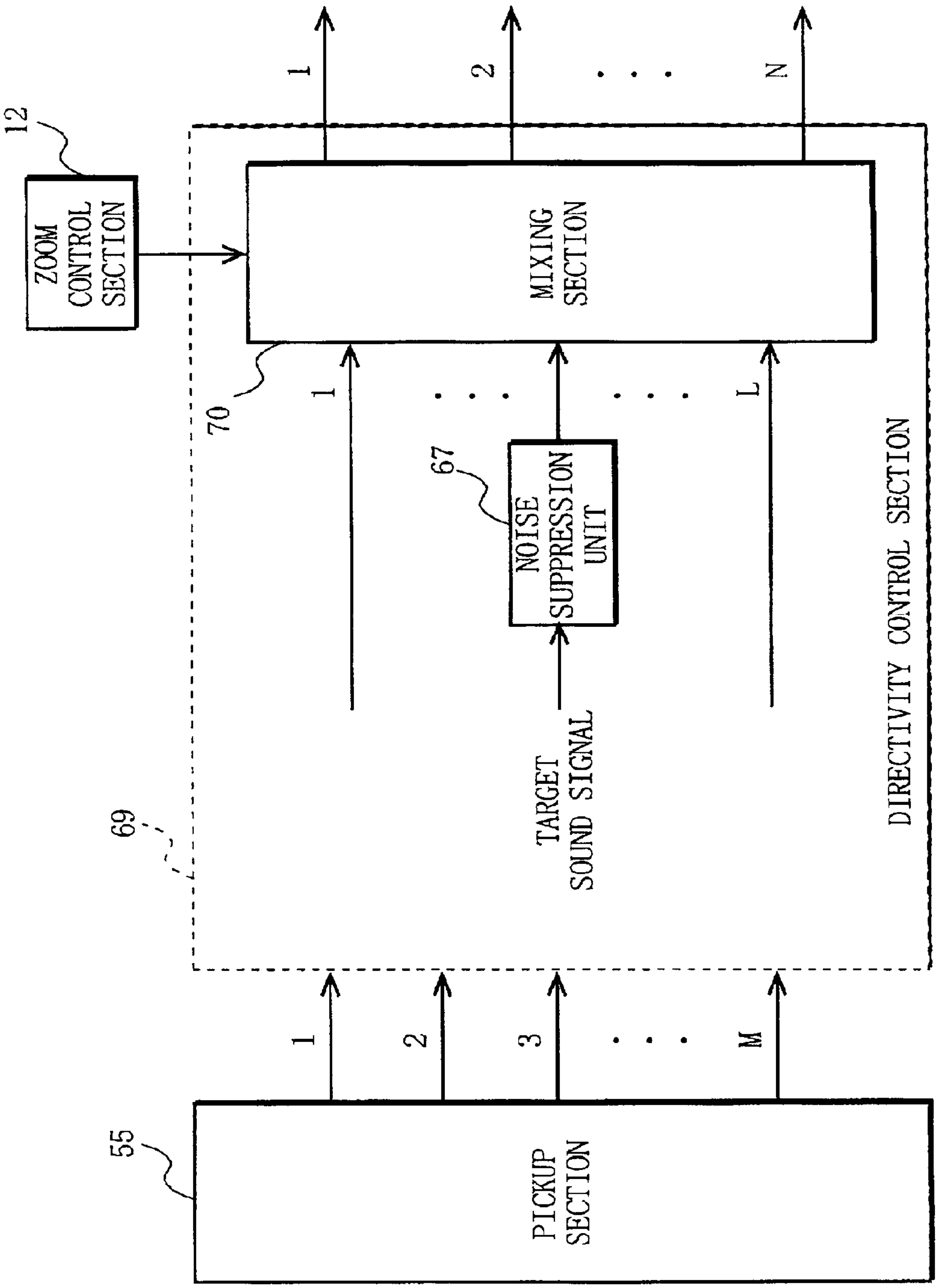
FIG. 20 is a block diagram showing a generalized structure of the zoom microphone device according to the third embodiment of the present invention.
Figure 22:
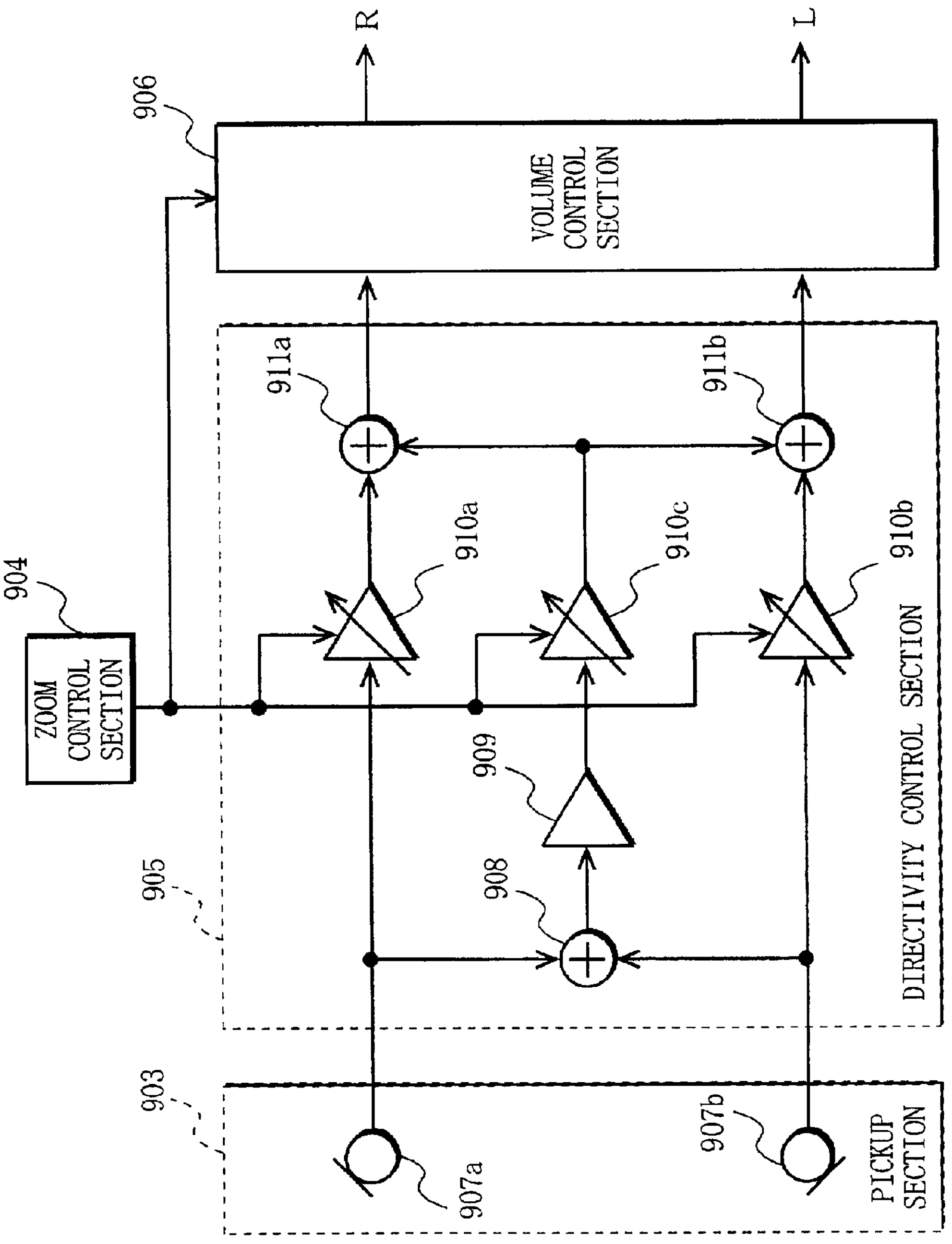
FIG. 22 PRIOR ART
FIG. 22 is a block diagram illustrating the structure of a second conventional example of a zoom microphone device.

As mentioned above in the description of the first embodiment, the structure of the pickup section 11 and the directivity control section 66 may be modified in various manners. FIG. 20 shows a generalized structure of the zoom microphone device according to the third embodiment of the present invention. The zoom microphone device of the third embodiment as shown in FIG. 20. includes: a pickup section 55 which transduces sounds to M output audio signals; a zoom control section 12 for outputting a zoom position signal which is in accordance with a zoom position; and a directivity control section 69 for outputting N channel audio signals while varying the directivity characteristics of the zoom microphone device in accordance with the zoom position signal. The directivity control section 69 includes a noise suppression unit 67 for applying a predetermined degree of suppression to the background noise that is contained in the target sound signal, and a mixing section 70 for mixing the target sound signal and the other (L−1) audio signals at a ratio which is in accordance with the zoom position signal and outputting respective channel audio signals. The third embodiment is characterized in applying a predetermined degree of suppression to the background noise that is contained in the target sound signal which mainly contains sounds originating in the direction of a target sound under the telescopic operation, and in mixing the target sound signal with the other audio signals at a ratio which is in accordance with the zoom position signal. As summarized in FIG. 20, the number M of audio signals to be outputted from the pickup section 55, the number L of audio signals to be intermixed by the mixing section 70, and the number N of channel audio signals to be outputted from the directivity control section 56 can be arbitrarily selected. In the directivity control section 69 as shown in FIG. 20, the L audio signals (including the target sound signal) which are supplied to the mixing section 70 may include the audio signal which is outputted from the pickup section 55 itself, or an audio signal which is synthesized based on the audio signal which is outputted from the pickup section 55.

In the second or third embodiment of the present invention described above, the volume control section 15 shown in FIG. 1 and/or the frequency characteristics compensation section 29 shown in FIG. 9 may be additionally provided so as to more effectively enhance a target sound under the telescopic operation and to prevent a change in the frequency characteristics of the audio signal due to audio signal subtraction processes.

While the present invention has been described in detail, the foregoing description is in all aspects illustrative and not restrictive. It is to be understood that numerous other modification and variations can be devised without departing from the scope of the present invention.

What is claimed is:

1. A zoom microphone device having an audio zooming function of effectively enhancing a target sound in accordance with a zoom position, said device comprising:

a pickup section for transducing soundwaves to audio signals;

a zoom control section for outputting a zoom position signal corresponding to the zoom position;

a directivity control section for altering directivity characteristics of said zoom microphone device based on the zoom position signal outputted from said zoom control section; and a noise suppression section for suppressing background noise contained in the audio signals outputted from said pickup section;

wherein said directivity control section is operable to alter the directivity characteristics so as to enhance the target sound under a telescopic operation, and said noise suppression section is operable to apply a greater degree of suppression to the background noise contained in the audio signals under the telescopic operation than under a wide-angle operation; and said noise suppression section is operable to suppress the background noise by using at least one technique selected from a Wiener filter technique, a spectral subtraction technique, and a filter bank technique.

2. A zoom microphone device having, an audio zooming function of effectively enhancing a target sound in accordance with a zoom position, said device comprising:

a pickup section for transducing soundwaves to audio signals;

a zoom control section for outputting a zoom position signal corresponding to the zoom position;

a directivity control section for altering directivity characteristics of said zoom microphone device based on the zoom position signal outputted from said zoom control section; and a noise suppression section for suppressing background noise contained in the audio signals outputted from said pickup section;

wherein said directivity control section is operable to alter the directivity characteristics so as to enhance the target sound under a telescopic operation, and said noise suppression section is operable to apply a greater degree of suppression to the background noise contained in the audio signals under the telescopic operation than under a wide-angle operation;

wherein said directivity control section is operable to generate a plurality of channel audio signals based on the audio signals outputted from said pickup section; and wherein said noise suppression section comprises:

an estimation section for estimating the amount of background noise contained in the plurality of channel audio signals based on at least one of the plurality of channel audio signals; and a plurality of suppression sections for suppressing the background noise contained in the respective channel audio signals based on a result of the estimation by said estimation section.

3. The zoom microphone device according to claim 2, wherein:

said estimation section comprises an averaging section for generating an audio signal which represents an average of the plurality of channel audio signals; and said estimation section is operable to estimate the amount of background noise contained in the plurality of channel audio signals based on the audio signal generated by said averaging section.

* * * * *

UNITED STATES PATENT AND TRADEMARK OFFICE

CERTIFICATE OF CORRECTION

PATENT NO. : 6,931,138 B2
DATED : August 16, 2005
INVENTOR(S) : Takashi Kawamura et al.

It is certified that error appears in the above-identified patent and that said Letters Patent is hereby corrected as shown below:

Column 19,
Line 23, please delete "," after "having" and before "an".

Signed and Sealed this

Sixth Day of December, 2005

JON W. DUDAS
*Director of the United States Patent and Trademark Office*

US006931138C1

(12) EX PARTE REEXAMINATION CERTIFICATE (7345th)

United States Patent

Kawamura et al.

(10) Number: US 6,931,138 C1

(45) Certificate Issued: Feb. 2, 2010

(54) ZOOM MICROPHONE DEVICE

(75) Inventors: Takashi Kawamura, Osaka (JP); Takeo Kanamori, Hirakata (JP); Toshihide Ishimoto, Izumi (JP)

(73) Assignee: Matsushita Electric Industrial Co. Ltd., Kadoma-Shi, Osaka-Fu (JP)

Reexamination Request:
No. 90/009,027, Feb. 5, 2008

Reexamination Certificate for:

| | |
|---|---|
| Patent No.: | **6,931,138** |
| Issued: | **Aug. 16, 2005** |
| Appl. No.: | **09/983,284** |
| Filed: | **Oct. 23, 2001** |

Certificate of Correction issued Dec. 6, 2005.

(30) Foreign Application Priority Data

Oct. 25, 2000 (JP) ....................................... 2000-325285

(51) Int. Cl.
*H04R 3/00* (2006.01)
*H04R 1/40* (2006.01)

(52) U.S. Cl. ....................... 381/92; 381/94.1; 348/231.4

(58) Field of Classification Search ........................ None
See application file for complete search history.

(56) References Cited

U.S. PATENT DOCUMENTS 4,984,087 A 1/1991 Fujimura et al.
6,445,801 B1 * 9/2002 Pastor et al. ............... 381/94.2

FOREIGN PATENT DOCUMENTS

| | | |
|---|---|---|
| JP | 63-072270 | 4/1988 |
| JP | 06-075591 | 3/1994 |
| JP | 06-178383 | 6/1994 |

* cited by examiner

*Primary Examiner*—Andrew L Nalven

(57) ABSTRACT

A pickup section transduces sounds to audio signals. A zoom control section outputs a zoom position signal corresponding to a zoom position. A directivity control section alters the directivity characteristics under a telescopic operation so as to mainly pick up sounds coming from a frontal direction with an enhancement which is in accordance with the zoom position signal, thereby outputting an R channel audio signal and an L channel audio signal. In accordance with the zoom position signal, a noise suppression section applies a greater degree of suppression to the background noise contained in the respective channel audio signals under the telescopic operation than under a wide-angle operation. As a result, a target sound from a remote location can be picked up with a sufficient enhancement in accordance with the zoom position under the telescopic operation.

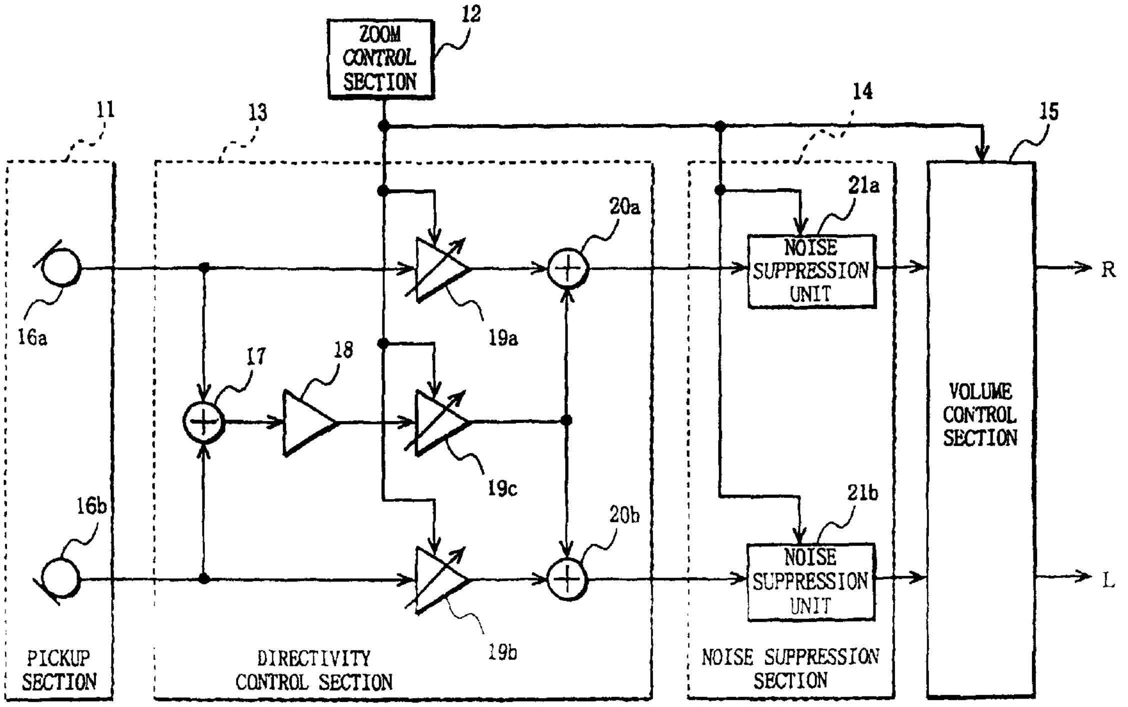

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

Claims 2 and 3 were not reexamined.

* * * * *